(12) United States Patent
Sekiguchi et al.

(10) Patent No.: US 11,335,371 B2
(45) Date of Patent: May 17, 2022

(54) REPRODUCTION APPARATUS AND REPRODUCTION METHOD

(71) Applicant: SONY SEMICONDUCTOR SOLUTIONS CORPORATION, Kanagawa (JP)

(72) Inventors: Koji Sekiguchi, Kanagawa (JP); Toshihiro Horigome, Kanagawa (JP); Kenji Yamamoto, Kanagawa (JP); Kotaro Kurokawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 652 days.

(21) Appl. No.: 16/326,012

(22) PCT Filed: Jul. 4, 2017

(86) PCT No.: PCT/JP2017/024443
§ 371 (c)(1),
(2) Date: Feb. 15, 2019

(87) PCT Pub. No.: WO2018/061377
PCT Pub. Date: Apr. 5, 2018

(65) Prior Publication Data
US 2021/0390981 A1 Dec. 16, 2021

(30) Foreign Application Priority Data
Sep. 30, 2016 (JP) .............................. JP2016-194653

(51) Int. Cl.
*G11B 7/0065* (2006.01)
*G11B 7/007* (2006.01)
(Continued)

(52) U.S. Cl.
CPC .......... *G11B 7/00718* (2013.01); *G11B 7/005* (2013.01); *G11B 7/13* (2013.01); *G11B 7/1362* (2013.01); *G11B 7/1395* (2013.01)

(58) Field of Classification Search
None
See application file for complete search history.

(56) References Cited

U.S. PATENT DOCUMENTS 5,835,470 A * 11/1998 Campbell .......... G11B 7/08576
369/103
6,084,843 A * 7/2000 Abe ....................... G11B 7/123
369/112.07
(Continued)

FOREIGN PATENT DOCUMENTS

JP 2010-044832 A 2/2010
JP 2014-026708 A 2/2014
(Continued)

OTHER PUBLICATIONS

Sep. 17, 2019, European Search Report issued for related EP Application No. 17855336.8.

*Primary Examiner* — Peter Vincent Agustin
(74) *Attorney, Agent, or Firm* — Paratus Law Group, PLLC

(57) ABSTRACT

A reproduction apparatus dividing a cross section of superposed light into a plurality of regions in a tangential and/or radial direction includes: an optical system configured to generate each of a first set of signal light and reference light having a phase difference of approximately 0°, a second set of signal light and reference light having a phase difference of approximately 180°, a third set of signal light and reference light having a phase difference of approximately 90°, and a fourth set of signal light and reference light having a phase difference of approximately 270°, using a plurality of superposed light beams corresponding to the
(Continued)

divided regions; an optical receiver configured to output signals corresponding to the sets of the signal light and the reference light; and a circuit configured to compute signals as differences between the signals, and obtain a reproduction signal by computation from the computed signals.

8 Claims, 26 Drawing Sheets

(51) Int. Cl.
    *G11B 7/005*     (2006.01)
    *G11B 7/13*     (2012.01)
    *G11B 7/1362*     (2012.01)
    *G11B 7/1395*     (2012.01)

(56) References Cited

U.S. PATENT DOCUMENTS

| | | | |
|---|---|---|---|
| 2003/0095477 A1* | 5/2003 | Horimai | G11B 11/10534 369/13.28 |
| 2008/0310281 A1* | 12/2008 | Hara | G11B 7/00772 369/103 |
| 2009/0316539 A1* | 12/2009 | Mikami | G11B 7/1359 369/44.32 |
| 2012/0213049 A1* | 8/2012 | Kikugawa | G11B 7/0065 369/59.2 |
| 2013/0215730 A1* | 8/2013 | Okamoto | G11B 7/128 369/103 |
| 2014/0036651 A1* | 2/2014 | Sekiguchi | G11B 7/00718 369/116 |
| 2014/0341006 A1 | 11/2014 | Miyashita et al. | |
| 2014/0341007 A1 | 11/2014 | Sano et al. | |
| 2015/0036472 A1* | 2/2015 | Saito | G11B 7/125 369/47.16 |
| 2016/0155468 A1 | 6/2016 | Nishi et al. | |
| 2018/0005662 A1* | 1/2018 | Sekiguchi | G11B 20/10046 |

FOREIGN PATENT DOCUMENTS

| | | |
|---|---|---|
| JP | 2014-032728 A | 2/2014 |
| TW | 200401279 A | 1/2004 |
| WO | WO 2016/120924 A1 | 8/2016 |
| WO | WO 2016/129022 A1 | 8/2016 |

\* cited by examiner

A

B

A

B

A

B

REPRODUCTION APPARATUS AND REPRODUCTION METHOD

CROSS REFERENCE TO PRIOR APPLICATION

This application is a National Stage Patent Application of PCT International Patent Application No. PCT/JP2017/024443 (filed on Jul. 4, 2017) under 35 U.S.C. § 371, which claims priority to Japanese Patent Application No. 2016-194653 (filed on Sep. 30, 2016), which are all hereby incorporated by reference in their entirety.

TECHNICAL FIELD

The present technology relates to a reproduction apparatus and a reproduction method applied to reproduction of an optical medium such as an optical disc.

BACKGROUND ART

For example, in a case where a multilayered optical disc is reproduced, a signal light amount may decrease, and an error highly likely occurs in signal reading. In order to address such a problem, a homodyne detection method in which a detection signal is amplified using light interference is known (see Patent Document 1).

In Patent Document 1, as a homodyne method for detecting light in which signal light and reference light interfere with each other, four sets of signal light and reference light having a phase difference of 90° are detected. Specifically, detection is performed for each of the sets of signal light and reference light having phase differences of 0°, 90°, 180°, and 270°. Such detection of each set is performed by detecting a light intensity of the light in which the signal light and the reference light interfere with each other.

In the homodyne method, a component of the signal light amplified depending on the light intensity of the reference light can be obtained as a reproduction signal. By amplifying the signal light in this manner, it is possible to improve a signal-to-noise ratio (SNR) of the reproduction signal.

CITATION LIST

Patent Document

Patent Document 1: Japanese Patent No. 4564948

SUMMARY OF THE INVENTION

Problems to be Solved by the Invention

In the homodyne method, it is difficult to obtain a desired effect if there is an optical path length difference (phase offset) e between the signal light and the reference light. The phase offset θ has a phase variation of a relatively high frequency and a phase variation of a relatively low frequency caused by surface wobbling of the optical disc. The high frequency phase variation is generated, for example, due to minute unevenness (surface roughness) on the disc surface. In the technique of the aforementioned Document, it is difficult to prevent influence of such a high frequency phase variation.

Therefore, an object of the present technology is to provide a reproduction apparatus and a reproduction method capable of reducing influence of the high frequency phase variation while employing the homodyne detection method.

Solutions to Problems

The present technology is a reproduction apparatus that irradiates a recording medium having both a land and a groove to which a signal is recorded with light emitted from a light source to obtain a signal light that contains recording signals of both the land and the groove and generate reference light from the light emitted from the light source, forms superposed light by superposing the signal light and the reference light, and divides a cross section of the superposed light into a plurality of regions in a tangential direction and/or in a radial direction using a light dividing element, the reproduction apparatus including:

an optical system configured to generate each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

an optical receiver configured to output a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light; and a reproduction signal generation circuit configured to compute a differential signal a as a difference between the photodetection signal (I) and the photodetection signal (J) and a differential signal b as a difference between the photodetection signal (K) and the photodetection signal (L), and obtain a reproduction signal by computation from the differential signals a and b.

In addition, the present technology is a reproduction method including: irradiating a recording medium having both a land and a groove to which a signal is recorded with light emitted from a light source to obtain a signal light that contains recording signals of both the land and the groove and generate reference light from the light emitted from the light source, forming superposed light by superposing the signal light and the reference light, and dividing a cross section of the superposed light into a plurality of regions in a tangential direction and/or in a radial direction using a light dividing element;

generating each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

outputting a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light by an optical receiver; and computing a differential signal a as a difference between the photodetection signal (I) and the photodetection signal (J) and a differential signal b as a difference between the photodetection signal (K) and the photodetection signal (L), and obtaining a reproduction signal by computation from the differential signals a and b by a reproduction signal generation circuit.

Effects of the Invention

According to at least one of the embodiments, it is possible to reproduce a land/groove recording type optical recording medium using the homodyne detection method. According to the present technology, it is possible to prevent influence of the high frequency phase variation caused by unevenness on a disc surface. Note that, without necessarily limiting to the effects described herein, anyone of the effects described in the present technology may also be included.

MODE FOR CARRYING OUT THE INVENTION

The embodiments described below are specific examples preferable to the present technology and has various technologically preferable limitations. However, in the following description, the scope of the present technology is not limited to such embodiments unless a statement to limit the present technology is specified in particular.

Note that the present technology will be described in the following sequence.
<1. Exemplary Homodyne Detection Method>
<2. Another Exemplary Homodyne Detection Method>
<3. First Embodiment>
<4. Second Embodiment>
<5. Modifications>

1. Exemplary Homodyne Detection Method

An exemplary homodyne detection method will be described. In the following description, a so-called phase diversity-based homodyne detection method will be described by way of example.

"Optical Recording Medium to be Reproduced"

Figure 1:
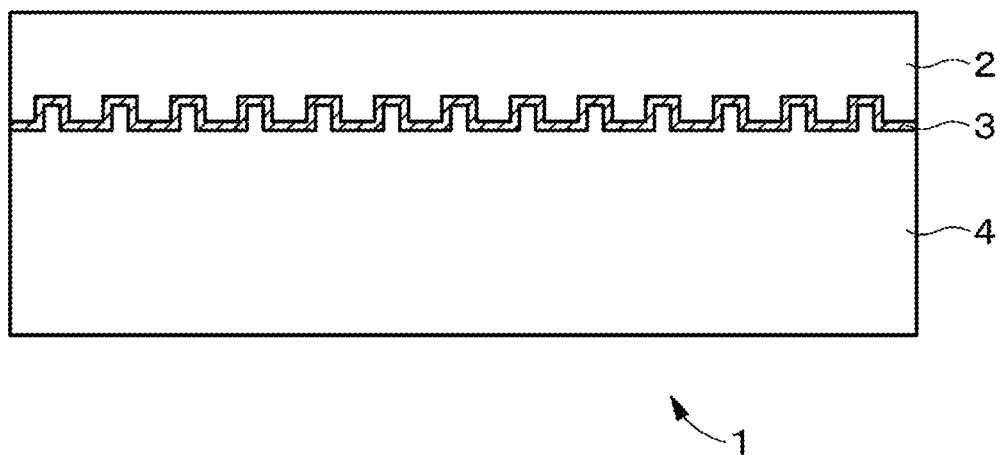
FIG. 1 is an explanatory diagram illustrating a cross-sectional structure of an optical recording medium to be reproduced.

FIG. 1 illustrates a cross-sectional structure of an optical recording medium 1 to be reproduced. A recording signal is reproduced by irradiating the optical recording medium 1 rotationally driven with laser light. On the optical recording medium 1, for example, information is recorded by forming a recording mark, so that it is regarded as a so-called draw type optical recording medium.

As illustrated in FIG. 1, the optical recording medium 1 includes a cover layer 2, a recording layer (reflection film) 3, and a substrate 4 sequentially from an upper layer side. Here, the "upper layer side" refers to a top layer side when a face to which laser light is incident from the reproduction apparatus side is placed as a top layer. That is, in this case, laser light is incident to the optical recording medium 1 from the cover layer 2 side.

In the optical recording medium 1, the substrate 4 includes, for example, resin such as polycarbonate, and its upper face side has an uneven cross-sectional shape. Such a substrate 4 is formed by, for example, injection molding using a stamper or the like.

In addition, a recording layer 3 is formed on the upper surface side of the substrate 4 having an uneven shape by sputtering or the like. Here, a track of the optical recording medium 1 to be reproduced in a conventional homodyne detection method is formed with a normal track pitch not exceeding an optical limitation value. That is, the track pitch of the recording layer 3 is set to be larger than the optical limitation value whose theoretical value is expressed as "$\lambda/NA/2$" (where "$\lambda$" denotes a reproduction wavelength, and "NA" denotes a numerical aperture of an objective lens).

The cover layer 2 overlying the recording layer 3 is formed, for example, by applying ultraviolet curing resin using a spin coat method or the like and then performing curing by emitting ultraviolet rays. The cover layer 2 is provided to protect the recording layer 3.

Figure 2:
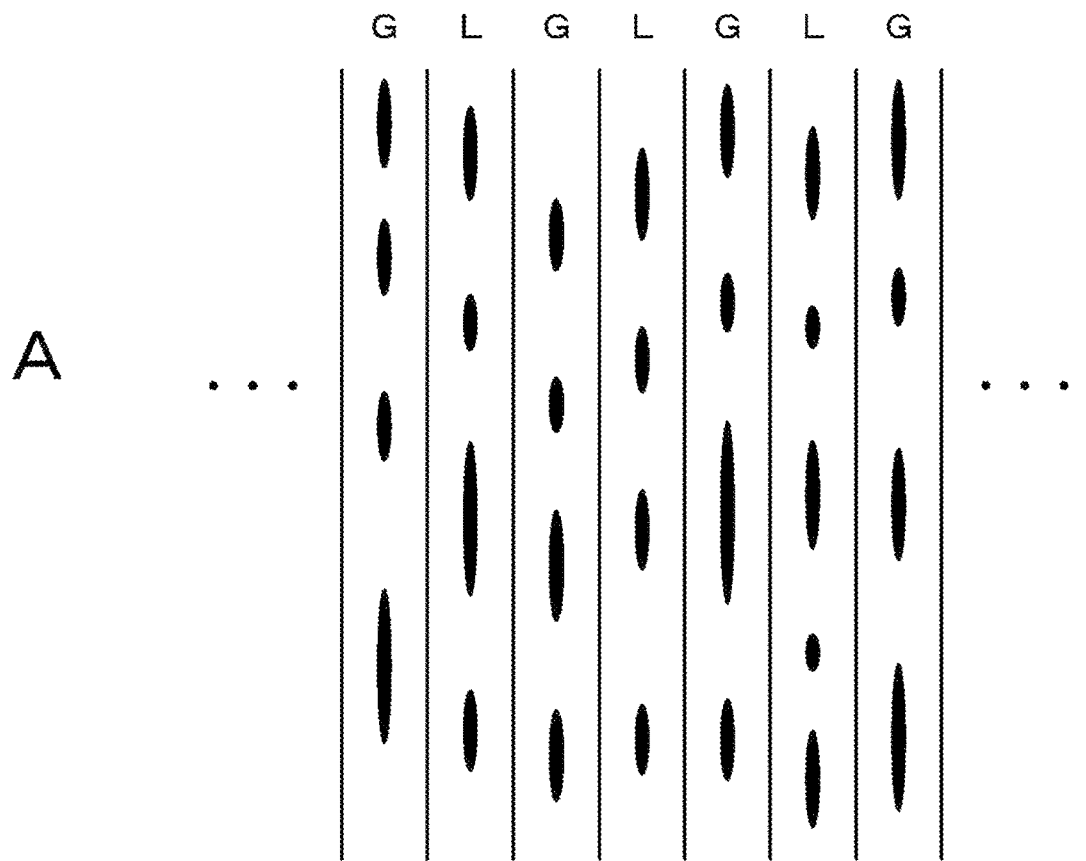
FIG. 2 is an explanatory diagram illustrating a structure of a recording surface of the optical recording medium to be reproduced.
Figure 2:
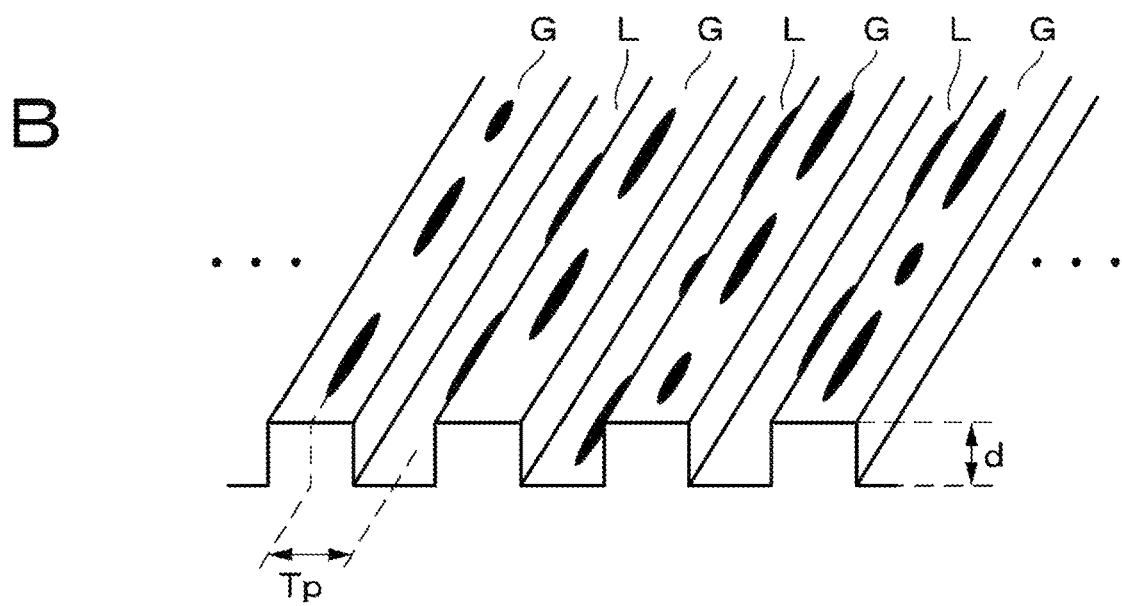

FIG. 2 illustrates a structure of the recording surface of the optical recording medium 1 to be reproduced. FIG. 2A is a partial enlarged plan view illustrating the recording surface, and FIG. 2B is a partial enlarged perspective view illustrating the recording surface. Note that FIG. 2B illustrates a surface on the side irradiated with laser light for reproduction, that is, the laser light for reproduction is emitted from the upper side of the drawing. The optical recording medium 1 is provided with grooves G and lands L. Here, in this specification, similarly to the case of Blu-ray Disc (registered trademark) (BD), the side where the laser light for reproduction first comes, that is, the convex side is defined as a groove G, and the concave side is defined as a land L.

In the optical recording medium 1 to be reproduced, mark lines are formed in both the grooves G and the lands L. Assuming that the mark line is a track, the track pitch Tp can be defined as a formation pitch between the land L and the groove G as illustrated in FIG. 2B. By setting the track pitch Tp to a narrow pitch exceeding the optical limitation value, an information recording density is improved. For example, assuming that the formation pitch of the grooves G in the optical recording medium 1 is equal to the track pitch (the formation pitch of the mark lines) in the conventional optical recording medium, the optical recording medium 1 has an information recording density increased nearly twice the conventional one.

A height difference (also referred to as "depth") between the land L and the groove G is denoted by "d". For example, assuming that the optical recording medium 1 has a refractive index of "n", the depth "d" is set to "$\lambda/8/n$". For example, if the reproduction wavelength is set to "=405 nm", and the refractive index is set to "n=1.5", the depth "d" becomes approximately 33 nm.

Here, in the optical recording medium 1, the formation pitch between the land L and the groove G exceeds the optical limitation value. Therefore, a relationship between beam spots of the reproduction light and the land L or groove G formed on the recording surface becomes, for example, that illustrated in FIG. 3.

Figure 3:
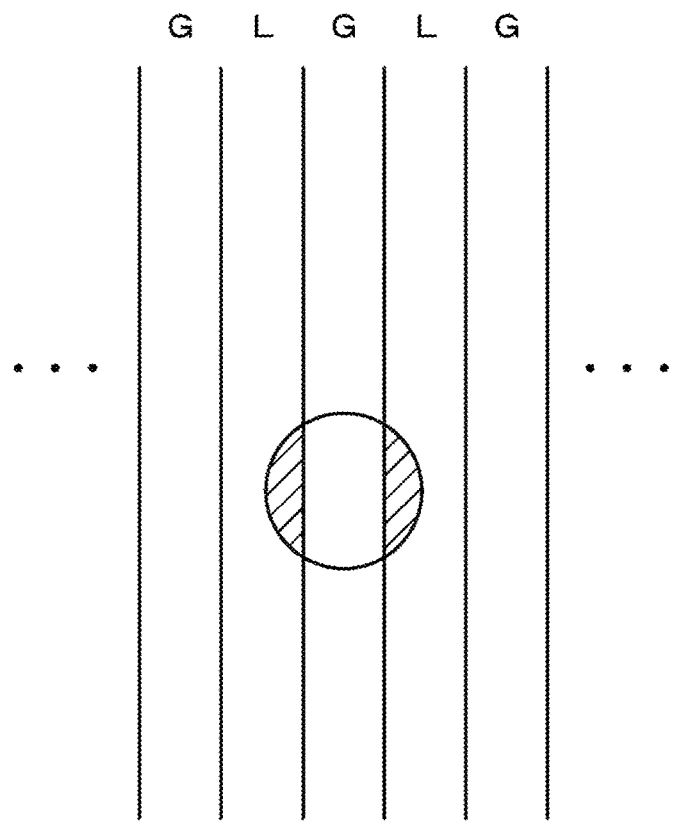
FIG. 3 is a schematic diagram illustrating a relationship between a beam spot of reproduction light formed on a recording surface and lands/grooves.

Similarly to the related art, it is assumed that an objective lens tracking servo control is performed for the grooves G or the lands L. FIG. 3 illustrates a case where the objective lens tracking servo control is performed for the grooves G. In this case, it is recognized that recording information of two adjacent lands L coexists in the reproduction signal of the groove G set as a servo control target.

Figure 4:
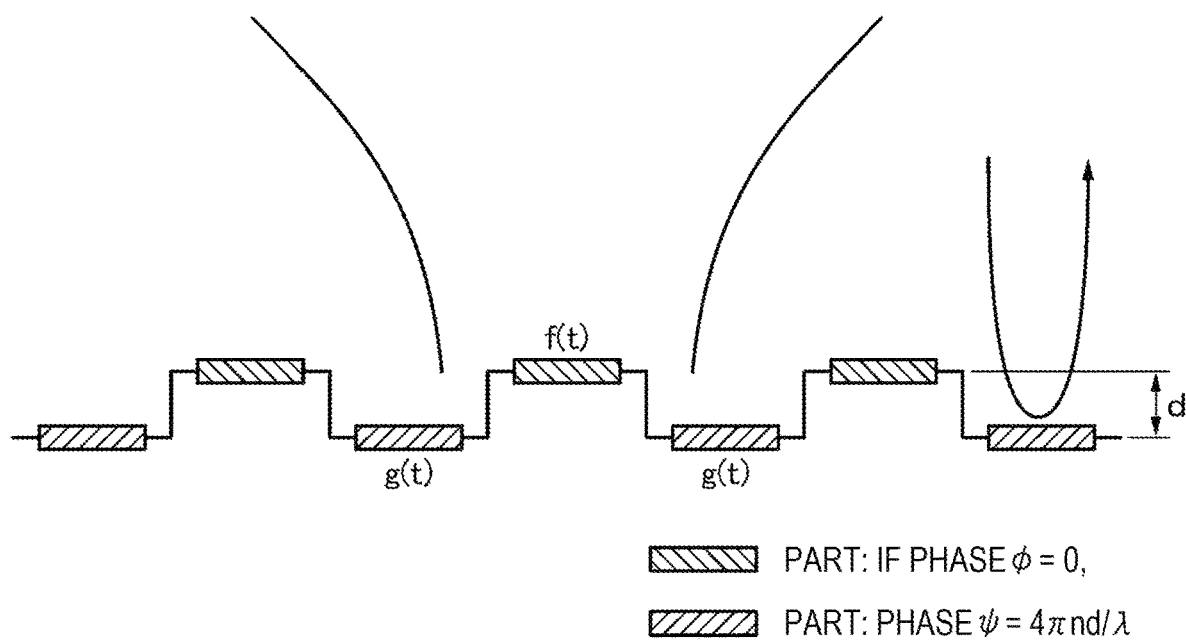
FIG. 4 is a schematic diagram used to describe a reproduction state of the optical recording medium.

That is, in the land/groove recording method, as the track pitch is narrowed, crosstalk is generated from an adjacent track. As illustrated in FIG. 4, in a case where the groove is reproduced, the reproduction signal g(t) of the adjacent land as well as the reproduction signal f(t) of the groove is also mixed. If the phase of the reproduction signal of the groove is set to "$\varphi=0$", the phase of the land becomes "$\psi=4\pi nd/\lambda$" (where "$\lambda$" denotes a wavelength, and "n" denotes a refractive index of the substrate of the optical recording medium 1).

"Exemplary Phase Diversity-Based Homodyne Detection Method"

In the phase diversity method, four sets of signal light and reference light having different phase differences of 90° are employed. Specifically, in the phase diversity method, detection is performed for sets of signal light and reference light having phase differences adjusted to approximately 0°, approximately 180°, approximately 90°, and approximately 270°, respectively. Detection of each set is performed by detecting the light intensity of the light in which the signal light and the reference light interfere with each other.

Figure 5:
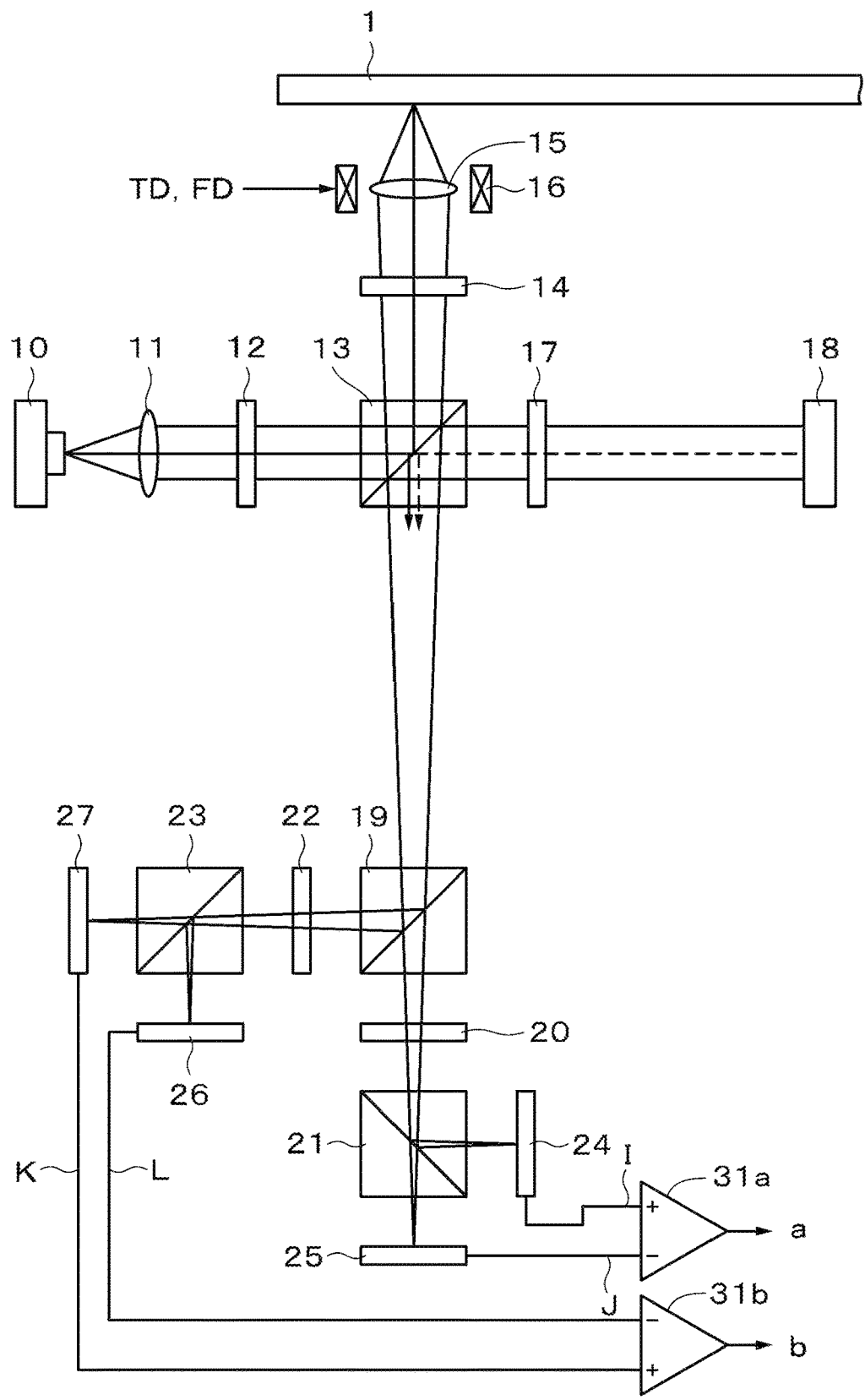
FIG. 5 is a schematic diagram illustrating a configuration of an optical system used in a reproduction apparatus.

FIG. 5 mainly illustrates a configuration of an optical system used in the phase diversity method. When the optical recording medium 1 is loaded on the reproduction apparatus, the optical recording medium 1 is rotatably driven by a spindle motor. A laser (semiconductor laser) 10 is provided in the optical system as a laser light source for reproduction. The laser light emitted from the laser 10 is collimated by a collimation lens 11 and is then incident to a polarization beam splitter 13 via a half-wave plate 12.

In this case, the polarization beam splitter 13 is configured to, for example, transmit P-polarized light and reflect S-polarized light. An installation angle of the half-wave plate 12 (rotation angle around an optical axis inside an incident plane of the laser light) is adjusted such that a ratio between the light output by transmitting through the polarization beam splitter 13 (P-polarized light component) and the light output by reflecting on the polarization beam splitter 13 (S-polarized light component) (that is, a spectral ratio caused by the polarization beam splitter 13) becomes, for example, approximately "1:1".

The laser light reflected on the polarization beam splitter 13 passes through a quarter-wave plate 14 and is then emitted such that it is condensed onto the recording layer of the optical recording medium 1 through an objective lens 15 held by a biaxial actuator 16.

The biaxial actuator 16 holds the objective lens 15 displaceable in a focus direction (contact/separate direction to/from the optical recording medium 1) and in a tracking direction (radial direction of the optical recording medium 1, perpendicular to the focus direction). The biaxial actuator 16 includes a focus coil and a tracking coil, and a focus drive signal FD and a tracking drive signal TD described below are supplied to the focus coil and the tracking coil, respectively. The objective lens 15 is displaced in the focus direction and the tracking direction depending on the focus drive signal FD and the tracking drive signal TD, respectively.

The reflection light from the recording layer of the optical recording medium 1 is incident to the polarization beam splitter 13 via the objective lens 15 and the quarter-wave plate 14. The reflection light incident to the polarization beam splitter 13 (homeward light) has a polarization direction different by 90° from that of the light incident from the laser 10 side and reflected by the polarization beam splitter 13 (outward light) by virtue of the action of the quarter-wave plate 14 and the action of the reflection on the recording layer. That is, the reflection light is incident to the polarization beam splitter 13 as P-polarized light. For this reason, the reflection light transmits through the polarization beam splitter 13. Note that, hereinafter, the reflection light that contains the recording signal of the optical recording medium 1 and transmits through the polarization beam splitter 13 in this manner will be referred to as a "signal light".

In FIG. 5, the laser light emitted from the laser 10 and transmitting through the polarization beam splitter 13 (P-polarized light) serves as reference light in the homodyne detection method. The reference light transmitting through the polarization beam splitter 13 passes through the quarter-wave plate 17 in the drawing, is then reflected on the mirror 18, passes through the quarter-wave plate 17 again, and is then incident to the polarization beam splitter 13.

Here, the reference light (homeward light) incident to the polarization beam splitter 13 in this manner has a polarization direction different from the reference light as the outward light by 90° (that is, S-polarized light) by virtue of the action of the quarter-wave plate 17 and the action of the reflection on the mirror 18. Therefore, the reference light as the homeward light is reflected on the polarization beam splitter 13.

In FIG. 5, the reference light reflected on the polarization beam splitter 13 in this manner is indicated by a dotted line arrow. In FIG. 5, the signal light transmitting through the polarization beam splitter 13 is indicated by a solid line arrow. The signal light and the reference light are emitted in a superposed state in the same direction by the polarization beam splitter 13. Specifically, in this case, the signal light and the reference light are emitted in the same direction while they are superposed such that their optical axes match each other. Here, the reference light is so-called coherent light.

The superposed light between the signal light and the reference light output from the polarization beam splitter 13 is incident to a half beam splitter 19. The half beam splitter 19 divides the incident light into reflection light and transmission light at a ratio of approximately 1:1.

The superposed light of the signal light and the reference light transmitting through the half beam splitter 19 is incident to the polarization beam splitter 21 via the half-wave plate 20. Meanwhile, the superposed light of the signal light and the reference light reflected on the half beam splitter 19 is incident to the polarization beam splitter 23 via the quarter-wave plate 22.

The half-wave plate 20 and the quarter-wave plate 22 are configured to rotate a plane of polarization. Therefore, by combining the half-wave plate 20 and the polarization beam splitter 21, it is possible to adjust a ratio of the light amount branched by the polarization beam splitter 21. Similarly, it is possible to adjust a ratio of the light amount branched by the polarization beam splitter 23 by using the quarter-wave plate 22.

The light amounts branched by each of the polarization beam splitters 21 and 23 have a ratio of approximately 1:1. The light reflected by the polarization beam splitter 21 is incident to a light detection unit 24, and the light transmitting through the polarization beam splitter 21 is incident to a light detection unit 25. The light reflected by the polarization beam splitter 23 is incident to a light detection unit 26, and the light transmitting through the polarization beam splitter 23 is incident to a light detection unit 27.

The photodetection signal output from the light detection unit 24 is denoted by "I", and the photodetection signal output from the light detection unit 25 is denoted by "J". In addition, the photodetection signal output from the light detection unit 26 is denoted by "L", and the photodetection signal output from the light detection unit 27 is denoted by "K".

These photodetection signals I to L are supplied to subtractors 31a and 31b. The photodetection signals I and J are supplied to the subtractor 31a, so that the subtractor 31a generates a differential signal "a" (where "a=I−J"), and the subtractor 31b generates a differential signal "b" (where "b=K−L").

Figure 6:
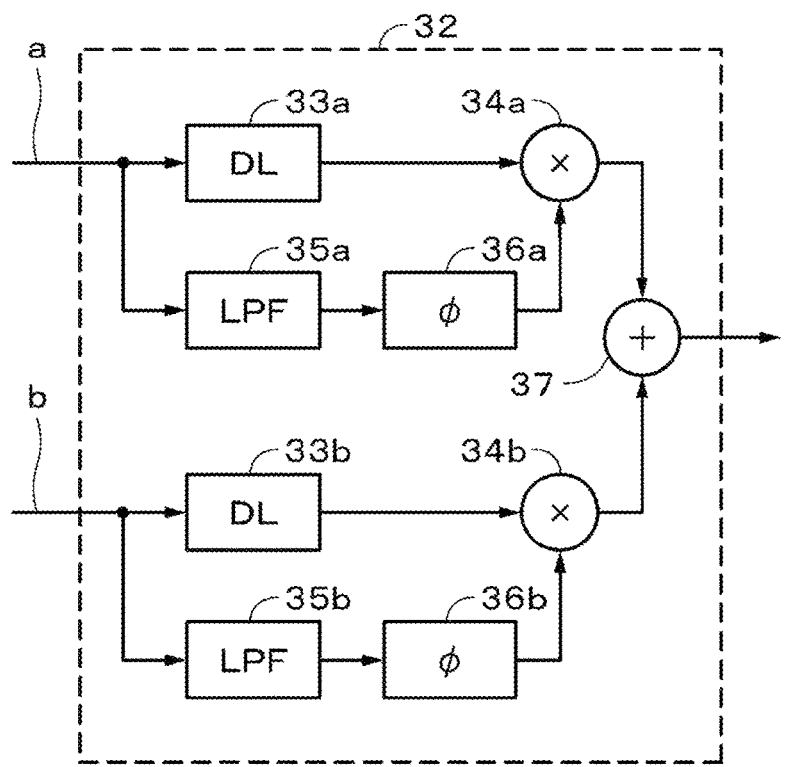
FIG. 6 is a block diagram illustrating a signal generation system of the reproduction apparatus using a phase diversity method.

As illustrated in FIG. 6, the aforementioned differential signals "a" and "b" are supplied to a computation circuit 32. The computation circuit 32 has delay circuits 33a and 33b, multiplication circuits 34a and 34b, lowpass filters 35a and 35b, offset ($\varphi$) setting circuits 36a and 36b, and an adder 37. The delay circuit 33a has a delay time equal to a delay amount generated in the lowpass filter 35a and the offset ($\varphi$) setting circuit 36a. The delay circuit 33b has a delay time equal to a delay amount generated in the lowpass filter 35b and the offset ($\varphi$) setting circuit 36b. The output of the multiplication circuit 34a and the output of the multiplication circuit 34b are supplied to the adder 37. A reproduction signal is extracted from the output of the adder 37.

The aforementioned reproduction apparatus can obtain a reproduction signal not affected by a phase shift $\theta(t)$ component of the reference light caused by surface shaking of the optical recording medium 1 or the like as described below.

The photodetection signals I to L are expressed by the following formulas. The meanings of each term in the formula will be described below.

R: reference light component

A: reflection component on a mirror surface (land part) formed on the recording surface of the optical recording medium f: modulation component depending on whether or not there is a recording mark (positive or negative value)

t: sampling time $\varphi$: phase difference between a mark to be read and an average phase of the signal light. This value is set by user's estimation.

$\theta$: optical path length difference between the signal light and the reference light (mainly caused by surface shaking of the optical recording medium 1)

Figure 7:
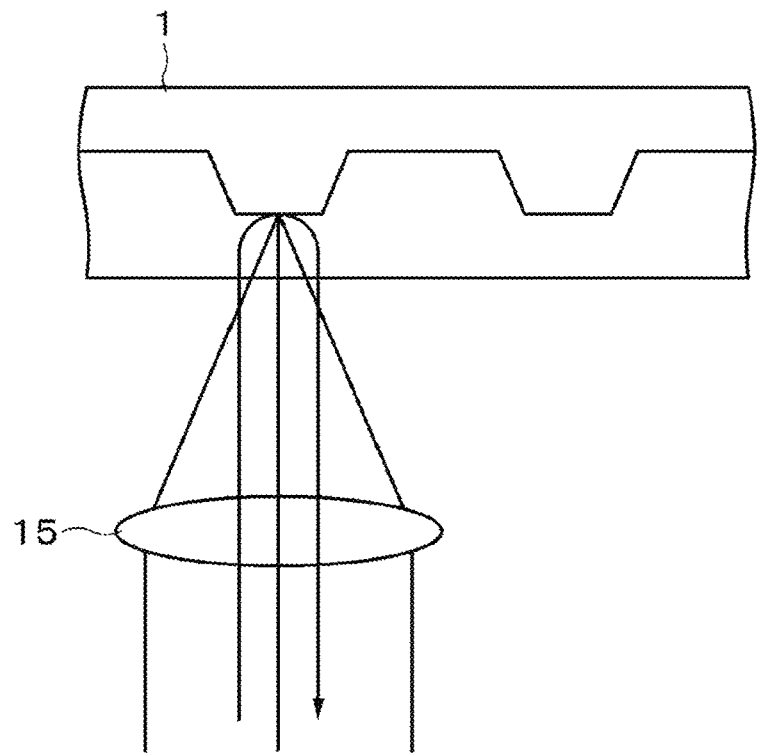
FIG. 7 is a schematic diagram for describing a reproduction state of the optical recording medium.

As illustrated in FIG. 7, if the objective lens 15 and the signal surface of the optical recording medium 1 change due to surface shaking, the optical path length of the signal light changes. Meanwhile, since the reference light is reflected on the mirror 18, the optical path length does not change. As a result, a phase difference between the signal light and the reference light is deviated from the set value. The component of this phase shift is set to θ(t).

[Formula 1]

$$4I = |A + f(t)e^{i\phi} + Re^{i\theta}|^2 = (A + f\cos\phi + R\cos\theta)^2 + (f\sin\phi + R\sin\theta)^2 \quad (1)$$

[Formula 2]

$$4J = |A + f(t)e^{i\phi} - Re^{i\theta}|^2 = (A + f\cos\phi - R\cos\theta)^2 + (f\sin\phi - R\sin\theta)^2 \quad (2)$$

[Formula 3]

$$4K = |A + f(t)e^{i\phi} + iRe^{i\theta}|^2 = (A + f\cos\phi - R\sin\theta)^2 + (f\sin\phi + R\cos\theta)^2 \quad (3)$$

[Formula 4]

$$4L = |A + f(t)e^{i\phi} - iRe^{i\theta}|^2 = (A + f\cos\phi + R\sin\theta)^2 + (f\sin\phi - R\cos\theta)^2 \quad (4)$$

The differential signal "a (=I−J)" of the subtractor 31a and the differential signal "b (=K−L)" of the subtractor 31b can be expressed as the following formulas.

[Formula 5]

$$a = I - J = (A + f\cos\phi)R\cos\theta + f\sin\phi R\sin\theta \quad (5)$$
$$= AR\cos\theta + fR\cos(\phi - \theta)$$

[Formula 6]

$$b = K - L = -(A + f\cos\phi)R\sin\theta + f\sin\phi R\cos\theta \quad (6)$$
$$= -AR\sin\theta + fR\sin(\phi - \theta)$$

Figure 8:
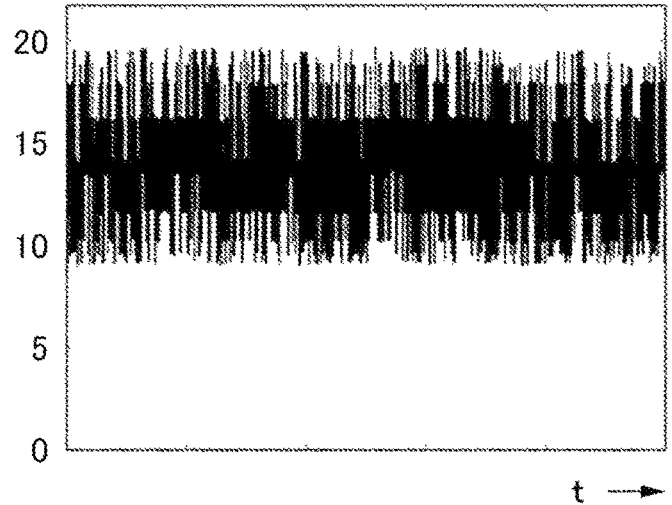
FIG. 8 is a schematic diagram for describing a phase diversity method.
Figure 8:
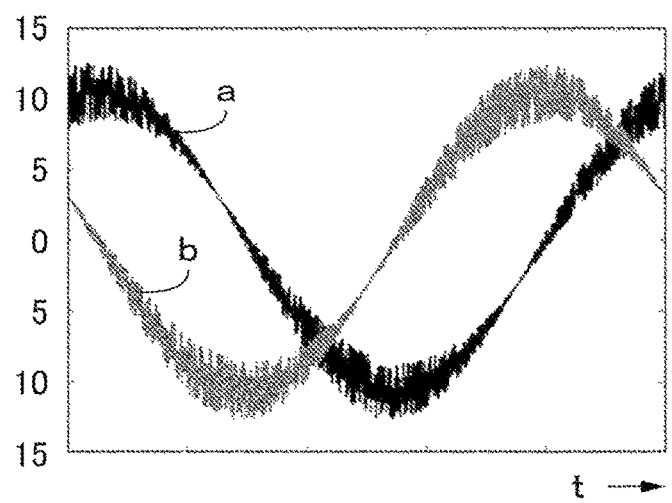
Figure 8:
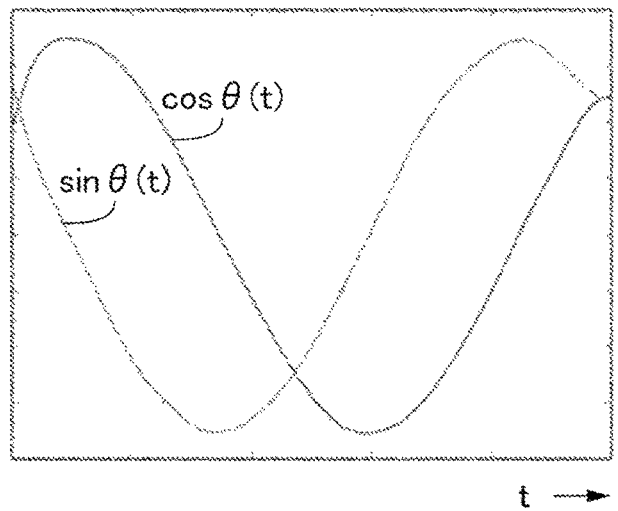

As shown in FIG. 8A, even in ordinary detection in which no homodyne detection is performed, a DC component of the reproduction signal appears depending on the mirror part of the background. In the case of homodyne detection, as shown in FIG. 8B, the DC component corresponding to the mirror part undulates depending on the phase θ corresponding to the optical path length difference of the reference light described above.

In order to obtain this phase θ, the differential signals "a" and "b" of FIG. 8B are supplied to the lowpass filters 35a and 35b, respectively. As shown in FIG. 8C, cos θ(t) and sin θ(t) can be obtained by the lowpass filters 35a and 35b. That is, in Formulas (5) and (6), "f" denotes a modulation component depending on whether or not there is a recording mark (set to a positive or negative value). Therefore, it is conceived that the term multiplied by the function "f" disappears, and the sin θ term and the cos θ term remain.

Since (tan θ=sin θ/cos θ), "θ" is obtained by (arctan θ=θ), and φ(offset) is set. In the multiplication circuit 34a, (cos (φ−θ(t)) is multiplied by "a", and in the multiplication circuit 34b, (sin (φ−θ(t))) is multiplied by "b". In addition, such multiplication outputs are added in the adder 37. The reproduction signal obtained from the adder 37 can be expressed as the following formula.

[Formula 7]

$$a \cdot \cos(\phi - \theta(t)) + b \cdot \sin(\phi - \theta(t)) = f(t)R + AR\cos\phi \quad (7)$$

As recognized from this formula, the component θ(t) is removed from the reproduction signal, so that a stable signal is obtained. Note that, although the phase difference between the signal light and the reference light caused by surface shaking may be canceled by controlling a position of the mirror 18 in the homodyne detection method, a configuration for such a position control of the mirror 18 can be omitted in the phase diversity method. In addition, it is recognized that a reproduction result can be obtained by amplifying the signal light component by the reference light component. That is, since the recording signal of the optical recording medium 1 is amplified and detected, it is possible to improve the SNR. Note that the terminologies of the phase diversity method mean a method of obtaining the reproduction signal by calculating a square sum ($a^2+b^2$) or a root-sum-square value of the differential signals "a" and "b". Herein, the terminologies of the phase diversity method are also applied to a computation for multiplying (cos(φ−θ (t)) by "a" and multiplying (sin(φ−θ(t)) by "b" in the multiplication circuit 34b as described above.

Figure 9:
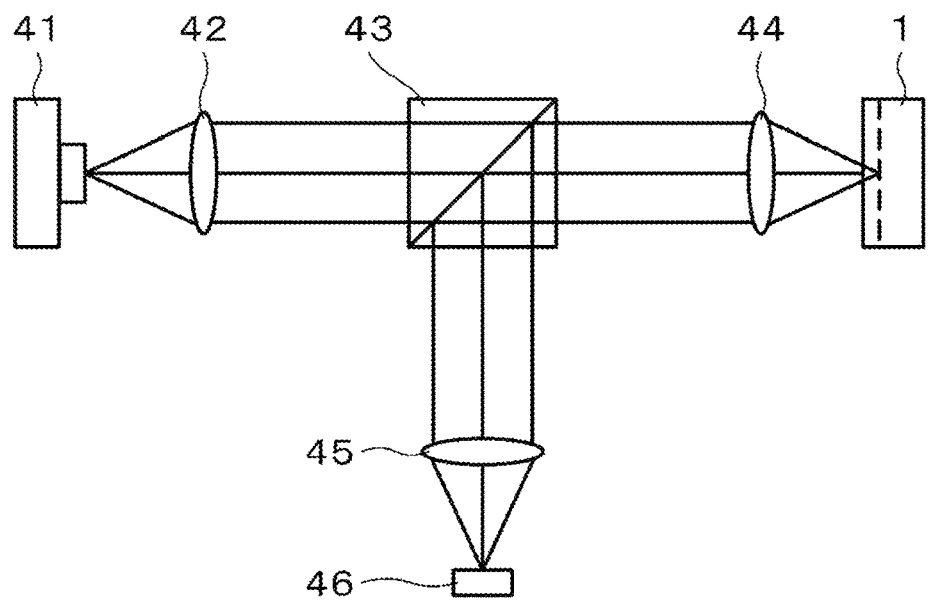
FIG. 9 is a schematic diagram illustrating an optical system of simulation and a graph showing a result obtained by simulating a relationship between a track pitch and jitter when height differences between lands and grooves are set to different values.
Figure 9:
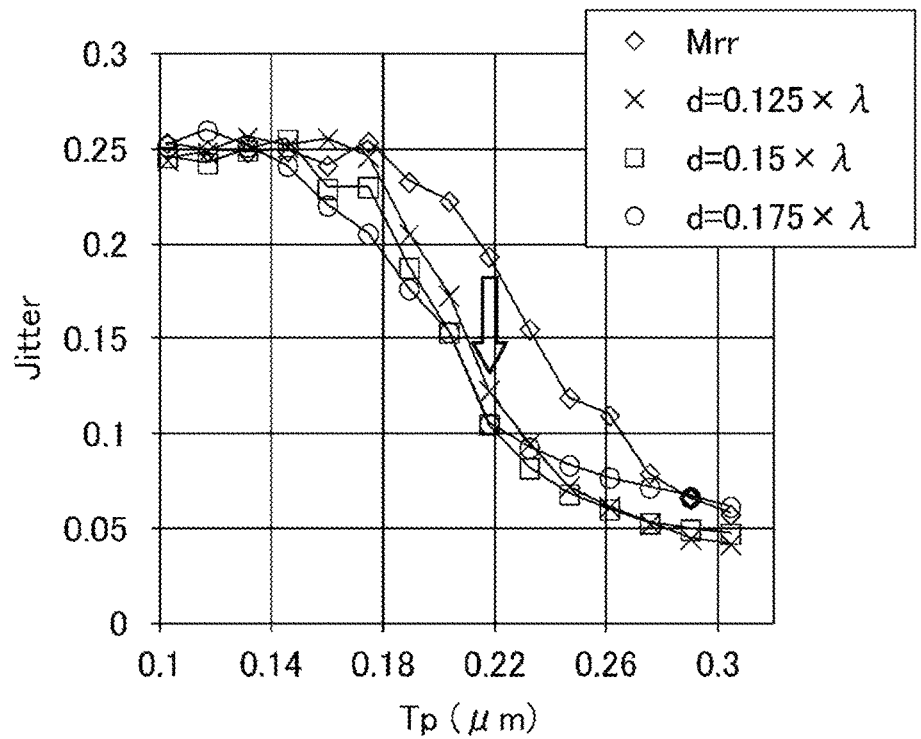

Assuming that the optical recording medium of the land/groove recording as described above is reproduced by the optical system of FIG. 9A, a result of obtaining the jitter of the reproduction signal for the case where the track pitch Tp changes (reproduction signal of the groove or the reproduction signal of the land) through simulation is shown in the graph of FIG. 9B. Note that the jitter is one of indices indicating reproduction performance. An index other than the jitter may also be employed.

As illustrated in FIG. 9A, the laser light from a laser diode 41 is emitted onto a signal surface of the optical recording medium 1 via a lens 42, a polarization beam splitter 43, and an objective lens 44. The reflection light from the signal surface is reflected on the polarization beam splitter 43 and is supplied to a light detection unit 46 via a lens 45. A reproduction signal is obtained from the light detection unit 46. The optical reproduction system of FIG. 9A does not employ the aforementioned homodyne detection.

Simulation was performed under the following calculation conditions. Note that it is assumed that there is no surface shaking, and a reproduction method that reduces inter-track crosstalk is employed.

$\lambda = 405$ nm, $NA = 0.85$, rim = 65%/65%, and groove duty = 50% inclination = 90°, mark reflectivity = 0%, mark width = 0.9 $Tp$, linear density = 25 GB constant The graph of FIG. 9B shows a change of the jitter value with respect to Tp for each of (Mrr (that means "mirror", d=0), (d=0.125λ), (d=0.15λ), and (d=0.175λ)). For example, for (Tp=0.22), the jitter can be reduced with respect to the depth of the groove other than the mirror. In addition, even when the depth of the groove is different, the jitter change can be set to be nearly similar.

Figure 10:
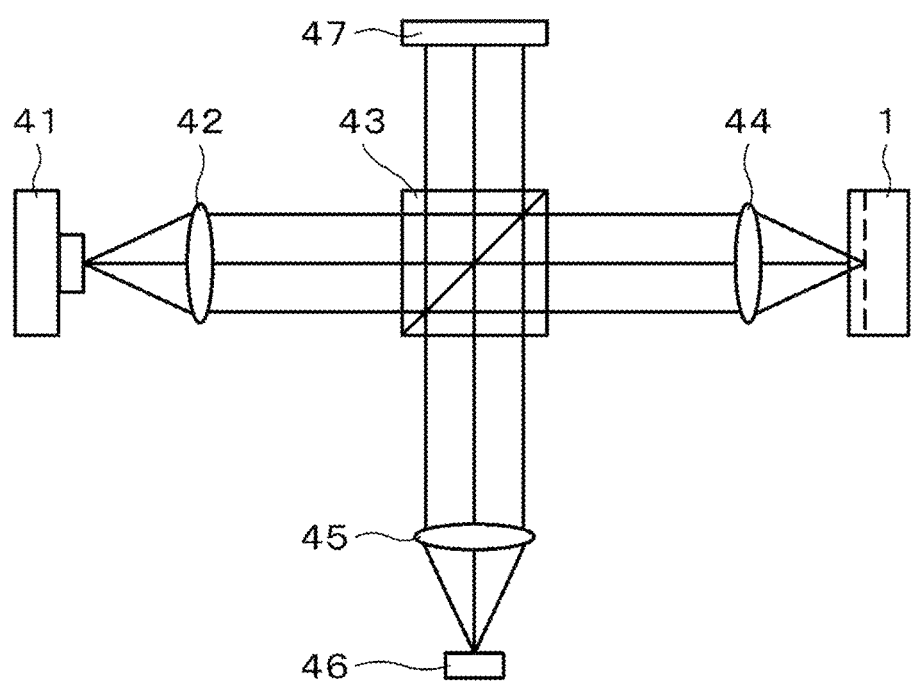
FIG. 10 is a schematic diagram illustrating an optical system of simulation and a graph showing a result obtained by simulating a relationship between a track pitch and jitter when height differences between lands and grooves are set to different values.
Figure 10:
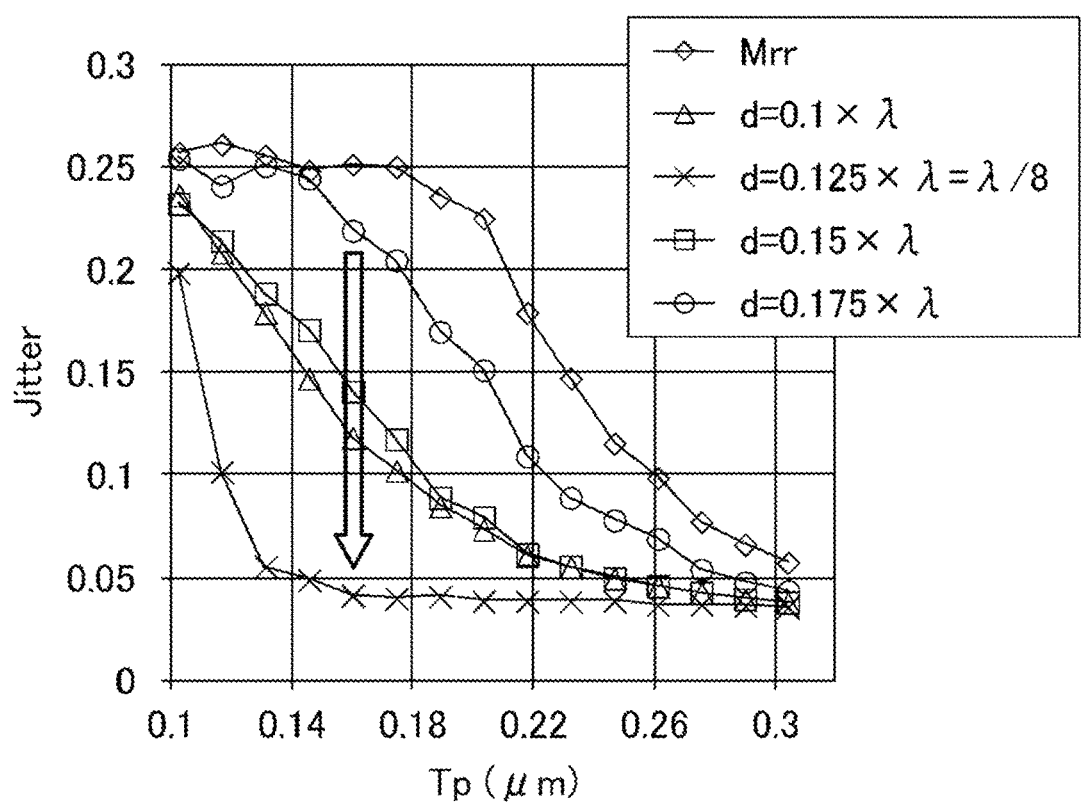

FIG. 10 illustrates a simulation result in a case where the optical recording medium 1 of the land/groove recording is reproduced by using homodyne detection. As illustrated in FIG. 10A, a mirror 47 is provided, and the reflection light from the optical recording medium 1 (signal light) and the reflection light of the mirror 47 (reference light) are supplied to the light detection unit 46 via the lens 45.

FIG. 10B shows a simulation result in a case where the optical system of FIG. 10A is employed. A calculation condition of the simulation is similar to that of FIG. 9B. The graph of FIG. 10B shows a change of the jitter value with respect to Tp for each of (Mrr (that means mirror, d=0), (d=0.1λ), (d=0.125λ=λ/8), (d=0.15λ), and (d=0.175λ)).

For example, for (Tp=0.15), the jitter can be reduced as compared with the mirror. However, a change of the jitter value varies depending on the value of the depth d. That is, in the case of (d=0.125λ=λ/8), the jitter can be remarkably improved, whereas in the case of (d=0.175λ), the jitter is significantly large. In addition, in the case of (d=0.1λ) and (d=0.15λ), it is difficult to say that the jitter value is sufficiently satisfactory. In the case of (d=λ/8), a phase difference of 90° may occur between the reproduction signal of the groove and the reproduction signal of the land. Therefore, crosstalk can be reduced, and the jitter can be improved.

As described above, there is a design constraint in the optical recording medium 1 because excellent reproduction performance is obtained only for a specific groove depth d. In addition, the value of (d=λ/8) is relatively large, which is not preferable in terms of recording of the mark on the land between the grooves. Furthermore, in a case where the value of "d" is large, it is difficult to make a surface of a wall of the height difference steep without inclination in a case of molding the optical disc. Therefore, preferably, the value of "d" is not limited to (λ/8).

2. Another Exemplary Homodyne Detection Method

In order to address this problem, an optical reproduction system similar to that of FIG. 5 and a reproduction signal generation circuit similar to that of FIG. 6 are employed. The differential signals formed from the photodetection signals I to L output from the light detection units 24 to 27 of FIG. 5 are supplied to the reproduction signal generation circuit having a configuration of FIG. 11.

The reproduction signal generation circuit includes subtractors 31a and 31b and a computation circuit 40. The photodetection signals I and J are supplied to the subtractor 31a, so that the subtractor 31a generates a differential signal "a" (a=I−J), and the computation circuit 31b generates a differential signal "b" (b=K−L). The differential signal "a" of the subtractor 31a and the differential signal "b" of the subtractor 31b are supplied to the computation circuit 40.

The computation circuit 40 has delay circuits 33a and 33b, multiplication circuits 34a and 34b, lowpass filters 35a and 35b, offset (ψ) setting circuits 39a and 39b, and a subtractor 50. The delay circuit 33a has a delay time equal to a delay amount generated in the lowpass filter 35a and the offset (ψ) setting circuit 39a. The delay circuit 33b has a delay time equal to a delay amount generated in the lowpass filter 35b and the offset (ψ) setting circuit 39b. The output of the multiplication circuit 34a and the output of the multiplication circuit 34b are supplied to the subtractor 50. A reproduction signal is extracted from the output of the subtractor 50.

As described below, in the offset (ψ) setting circuits 39a and 39b, a value (ψ) corresponding to the phase difference between the crosstalk and the average phase of signal light is a fixed value estimated and set by a user. For example, an offset of the phase corresponding to a height difference between the groove G and the land L, that is, the depth "d" is set. Since the value of the depth "d" of the optical recording medium 1 to be reproduced is known in advance, the offset ψ p can be set.

In the another exemplary homodyne method described above, as described below, it is possible to obtain a reproduction signal by removing inter-track crosstalk without being affected by the phase shift (θ(t)) component of the reference light caused by surface shaking of the optical recording medium 1 or the like. As described above in conjunction with FIGS. 3 and 4, if the track pitch is narrowed in the land/groove recording method, crosstalk occurs from the adjacent track. As illustrated in FIG. 4, in a case where a groove is reproduced, the reproduction signal g(t) of the adjacent land as well as the reproduction signal f(t) of the groove is also mixed. If the phase of the reproduction signal of the groove is set to zero (φ=0), the phase of the land becomes "ψ=4πnd/λ" (where "λ" denotes a wavelength, and "n" denotes a refractive index of the substrate of the optical recording medium 1).

The photodetection signals I to L are obtained using the optical reproduction system of FIG. 5. As described in the aforementioned formulas, each term of the formulas has the following meaning.

R: reference light component

A: reflection component on a mirror surface (land part) formed on the recording surface of the optical recording medium f: modulation component depending on whether or not there is a recording mark (positive or negative value)

g: crosstalk component from an adjacent track t: sampling time

φ: phase difference between a mark to be read and an average phase of the signal light. This value is set by user's estimation.

θ: optical path length difference between the signal light and reference light (mainly caused by surface shaking of the optical recording medium 1)

ψ: phase difference between the crosstalk and the average phase of the signal light. This value is set by user's estimation.

[Formula 8]

$$4I = |A + f(t)e^{i\phi} + g(t)e^{i\psi} + Re^{i\theta}|^2 \quad (8)$$
$$= (A + f\cos\phi + g\cos\psi + R\cos\theta)^2 + (f\sin\phi + g\sin\psi + R\sin\theta)^2$$

[Formula 9]

$$4J = |A + f(t)e^{i\phi} + g(t)e^{i\psi} - Re^{i\theta}|^2 \quad (9)$$
$$= (A + f\cos\phi + g\cos\psi - R\cos\theta)^2 + (f\sin\phi + g\sin\psi - R\sin\theta)^2$$

[Formula 10]

$$4K = |A + f(t)e^{i\phi} + g(t)e^{i\psi} + iRe^{i\theta}|^2 \quad (10)$$
$$= (A + f\cos\phi + g\cos\psi - R\sin\theta)^2 + (f\sin\phi + g\sin\psi + R\cos\theta)^2$$

[Formula 11]

$$4L = |A + f(t)e^{i\phi} + g(t)e^{i\psi} - iRe^{i\theta}|^2 \quad (11)$$
$$= (A + f\cos\phi + g\cos\psi + R\sin\theta)^2 + (f\sin\phi + g\sin\psi - R\cos\theta)^2$$

Figure 11:
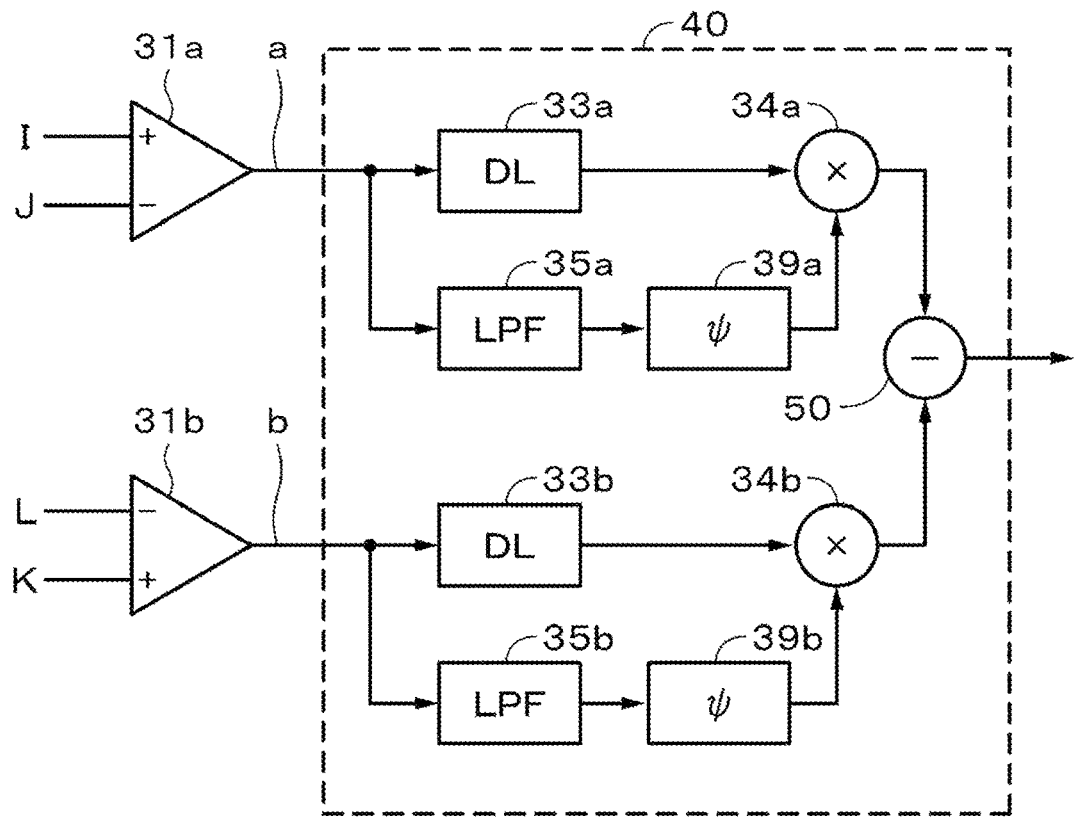
FIG. 11 is a block diagram illustrating a homodyne method signal generation system.

In addition, computation is performed using the reproduction signal generation circuit of FIG. 11. The differential signal "a" (=I−J) of the subtractor 31a and the differential signal "b" (=K−L) of the subtractor 31b can be expressed as the following formulas.

[Formula 12]

$$a = I - J = (A + f\cos\phi + g\cos\psi)R\cos\theta + (f\sin\phi + g\sin\psi)R\sin\theta \quad (12)$$
$$= AR\cos\theta + fR\cos(\phi - \theta) + gR\cos(\psi - \theta)$$

[Formula 13]

$$b = K \cdot L = -(A + f\cos\phi + g\cos\psi)R\sin\theta + (f\sin\phi + g\sin\psi)R\cos\theta \quad (13)$$
$$= -AR\sin\theta + fR\sin(\phi - \theta) + gR\sin(\psi - \theta)$$

As described above, $\cos\theta(t)$ and $\sin\theta(t)$ are obtained by the lowpass filters 35a and 35b. That is, in Formulas (12) and (13), "f" denotes a modulation component depending on whether or not there is a recording mark (set to a positive or negative value), and "g" denotes a crosstalk component from the adjacent track. Therefore, it is conceived that the terms multiplied by the functions "f" and "g" disappear, and the $\sin\theta$ term and the $\cos\theta$ term remain. Since ($\tan\theta = \sin\theta/\cos\theta$), "$\theta$" is obtained by ($\arctan\theta = \theta$), and $\psi$(offset) is set by the offset ($\psi$) setting circuits 39a and 39b. In the multiplication circuit 34a, ($\sin(\psi - \theta(t))$ is multiplied by "a", and in the multiplication circuit 34b, ($\cos(\psi - \theta(t))$ is multiplied by "b". In addition, such multiplication outputs are combined in the subtractor 50. A reproduction signal obtained from the subtractor 50 can be expressed as the following formula.

[Formula 14]

$$a \times \sin(\psi - \theta(t)) - b \times \cos(\psi - \theta(t)) = AR\cos\theta\sin(\psi - \theta) + \quad (14)$$
$$AR\sin\theta\cos(\psi - \theta) +$$
$$fR\cos(\phi - \theta)\sin(\psi - \theta) -$$
$$fR\sin(\phi - \theta)\cos(\psi - \theta)$$
$$= f(t)R\sin(\psi - \phi) + AR\sin\psi$$

As expressed in Formula (14), the component $\theta(t)$ is removed from the reproduction signal, so that a stable signal is obtained. Furthermore, the reproduction signal does not contain a reproduction signal component $g(t)$ of the adjacent track, and the inter-track crosstalk is removed.

Figure 12:
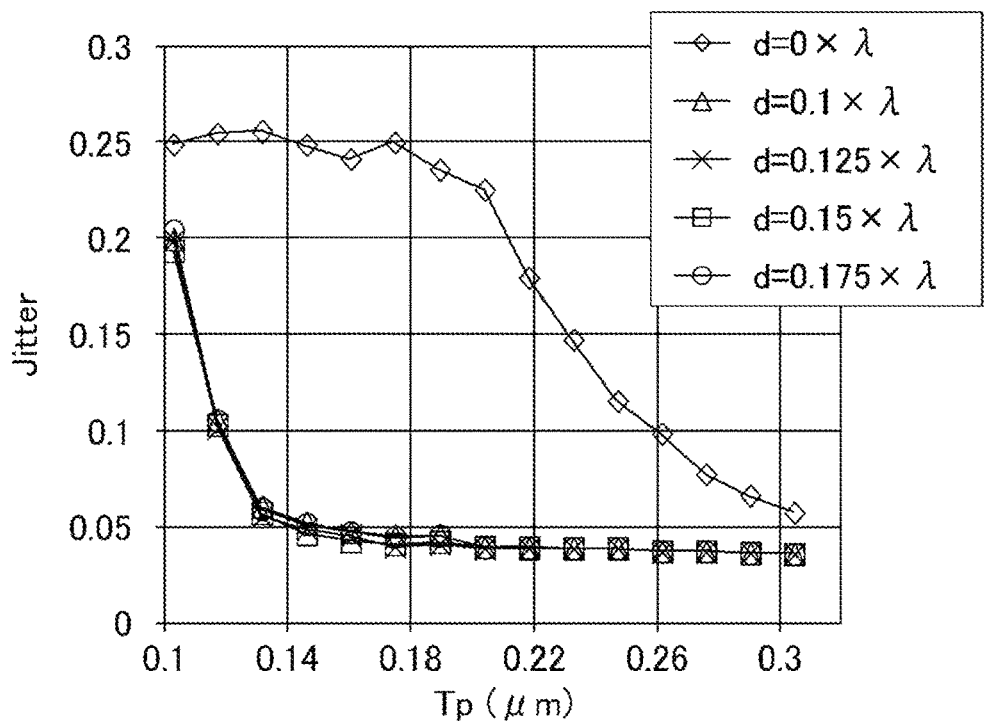
FIG. 12 is a graph showing a result obtained by simulating a relationship between a track pitch and jitter in a homodyne method signal generation system.

FIG. 12 shows a simulation result in a case where an optical system similar to the optical system of FIG. 10A is employed. A calculation condition of the simulation is similar to those of FIGS. 9B and 10B. The graph of FIG. 12 shows a change of the jitter value with respect to Tp for each of (Mrr (that means mirror, d=0), (d=0.1λ), (d=0.125λ=λ/8), (d=0.15λ), and (d=0.175λ)).

As recognized from the graph of FIG. 12, it is possible to reduce the jitter for all the values of "d" other than the mirror. In the case of FIG. 10B described above, the jitter can be remarkably improved only for the case of (d=0.125λ=λ/8). However, in another exemplary homodyne method, the jitter can be similarly remarkably improved even for different values of "d".

3. First Embodiment

Figure 13:
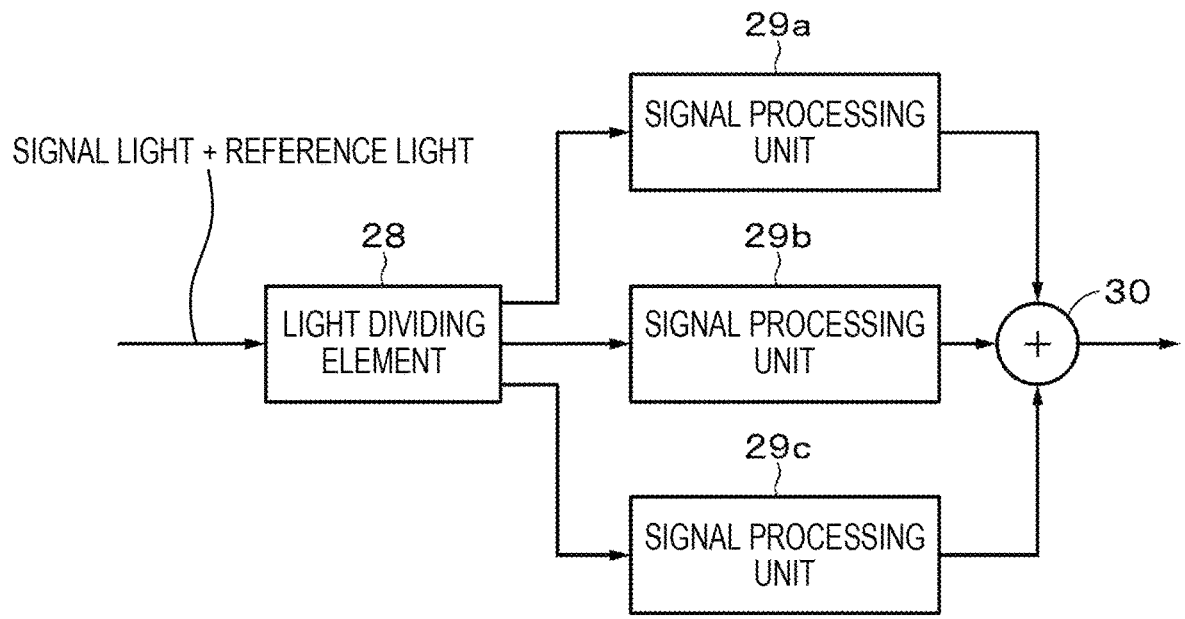
FIG. 13 is a block diagram used to schematically describe a first embodiment of the present technology.

As an outline of the first embodiment of the present technology, as illustrated in FIG. 13, a cross section of a light flux obtained by superposing signal light and reference light is divided into a plurality of, for example, three regions by a light dividing element 28, and reproduction signals of a plurality of channels corresponding to each region are obtained. In order to divide the light flux cross section by the light dividing element 28, for example, an optical path conversion element for dividing the cross section into a plurality of regions is arranged in an optical path of the light passing through the objective lens and reaching the photodetector, and a plurality of beams divided by the optical path conversion element are received by another photodetector. The optical path conversion element may include a diffraction element such as a holographic optical element, a refraction element such as a microlens array, a micro prism, or the like. As a method for obtaining the reproduction information signal for each region, in addition to the method of dividing the cross section using the light dividing element 28, a method of providing the photodetector with the function of the light dividing element by dividing the photodetector of the light detection unit can be employed.

Figure 14:
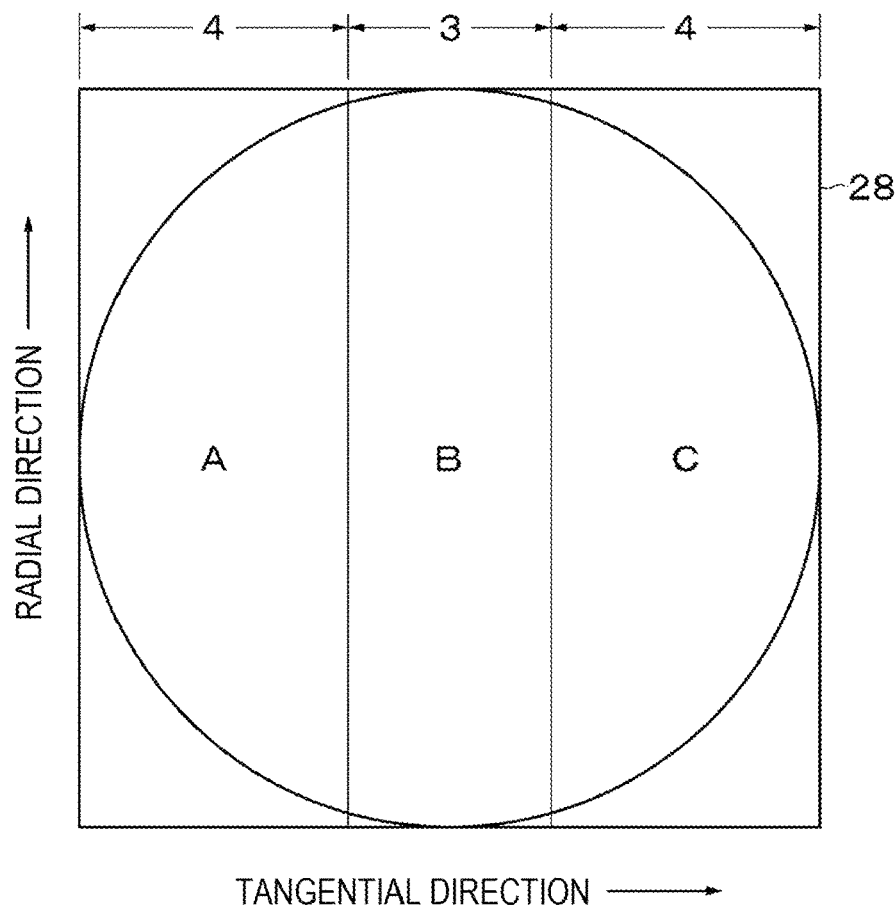
FIG. 14 is a schematic diagram illustrating an exemplary light dividing element.

Pupil division is performed in a tangential direction and/or a radial direction. For example, as illustrated in FIG. 14, a pupil is divided into three regions A, B, and C in the tangential direction. A ratio between three divisions is set to, for example, (4:3:4). The signals corresponding to three regions separated by the light dividing element 28 of the pupil division (appropriately referred to as Channel 1 signal, Channel 2 signal, and Channel 3 signal, respectively) contain different frequency components. That is, the Channel 2 signal corresponding to the center region B contains a lot of relatively low frequency components. The Channel 1 signal and the Channel 3 signal respectively corresponding to both side regions A and C contain a lot of relatively high frequency components. Three reproduction signals are respectively supplied to the homodyne method signal processing units 29a, 29b, and 29c. Each of the signal processing units 29a, 29b, and 29c is provided with an adaptive equalizer circuit. By adding the outputs of the signal processing units 29a, 29b, and 29c in the adder circuit 30, for example, it is possible to obtain a reproduction signal from which a phase variation caused by minute unevenness on the disc surface is removed.

"Configuration of Optical System"

Figure 15:
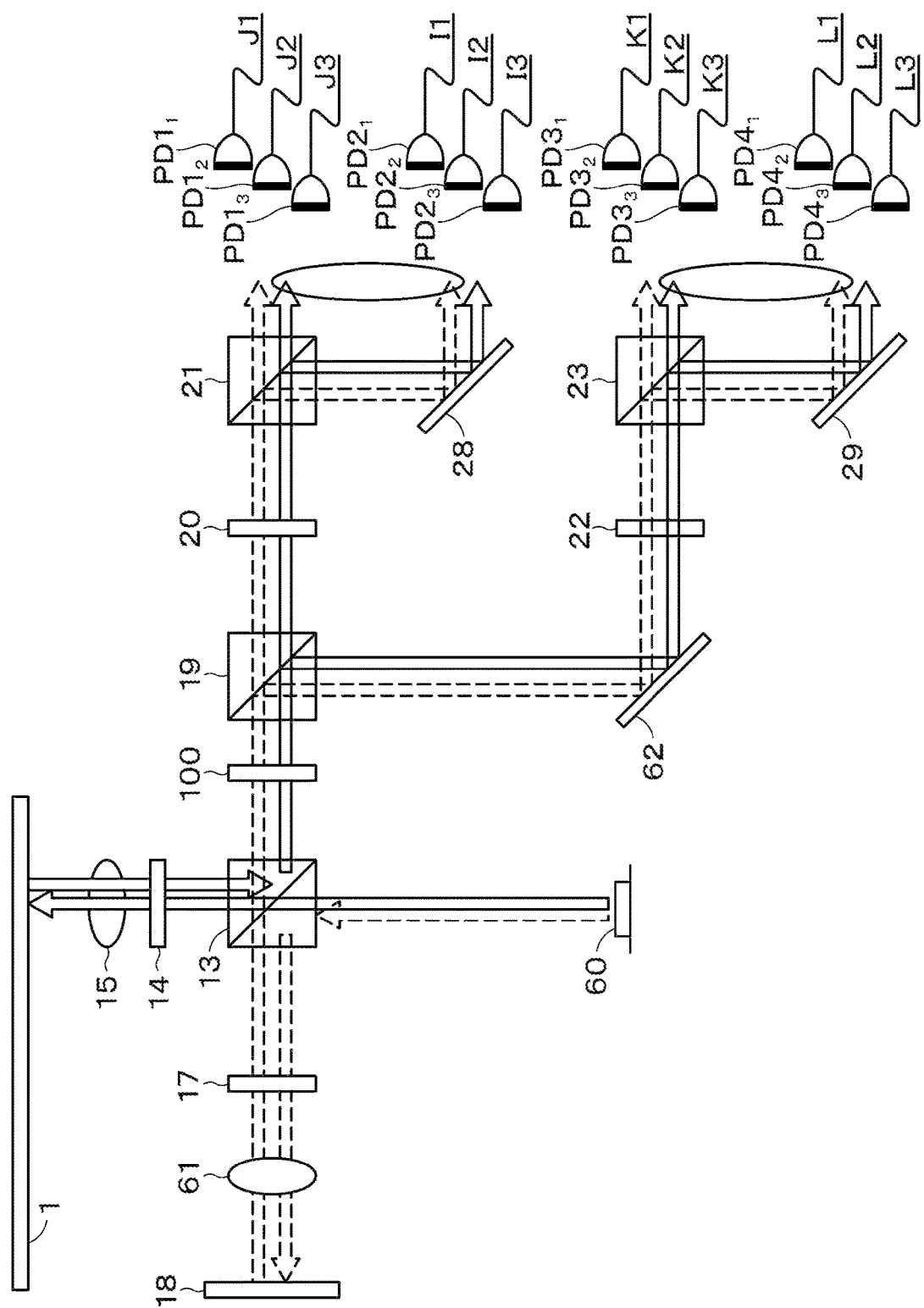
FIG. 15 is a schematic diagram used to describe an optical system according to the first embodiment of the present technology.

An optical configuration according to the first embodiment of the present technology will be described with reference to FIG. 15. The configuration is similar to the configuration of the optical system used in the phase diversity method of FIG. 5 described above, and like reference numerals denote like elements. Note that an optical path of the reproducing light is indicated by a solid line, and an optical path of the reference light is indicated by a dotted line.

When the optical recording medium 1 is loaded on the reproduction apparatus, the optical recording medium 1 is rotatingly driven by a spindle motor. A laser (semiconductor laser) 60 is provided in the optical system as a laser light source for reproduction. The laser light emitted from the laser 60 is condensed and emitted onto the recording layer 3 of the optical recording medium 1 via the polarization beam splitter 13, the quarter-wave plate 14, and the objective lens 15.

The reflection light from the recording layer 3 (homeward light) passes through the objective lens 15 and the quarter-wave plate 14 and is incident to the polarization beam splitter 13. The reflection light incident to the polarization beam splitter 13 has a polarization direction different by 90° from that of the light incident from the laser 60 side and transmitting through the polarization beam splitter 13 (outward light) by virtue of the action of the quarter-wave plate 14 and the action of the reflection on the recording layer 3. That is, the reflection light is incident to the polarization beam splitter 43 in an S-polarized light state. For this reason, the reflection light as homeward light is reflected on the polarization beam splitter 13.

In a case where the laser light from the laser 60 is incident to the polarization beam splitter 13, a part of the laser light, for example, a half of the light amount is reflected and is then incident to the mirror 18 via the quarter-wave plate 17 and the lens 61. The component reflected by the mirror 18 is incident to the polarization beam splitter 13 as the reference light via the lens 61 and the quarter-wave plate 17. The superposed light of the homeward light and the reference light described above is incident to the holographic optical element 100 serving as the light dividing element.

The superposed light from the polarization beam splitter 13 is divided by the holographic optical element 100 into a plurality of, for example, three regions including signals having different bands in the tangential direction of the optical disc 1. The light from the holographic optical element 100 is incident to the half beam splitter 19. The half beam splitter 19 divides the incident light into reflection light and transmission light at a ratio of approximately 1:1.

The superposed light of the homeward light and the reference light transmitting through the half beam splitter 19 is incident to the polarization beam splitter 21 via the half-wave plate 20. Meanwhile, the superposed light of the homeward light and the reference light reflected by the half beam splitter 19 is reflected on the mirror 62, and is incident to the polarization beam splitter 23 via the quarter-wave plate 22.

The half-wave plate 20 and the quarter-wave plate 22 can rotate a plane of polarization. Therefore, by combining the half-wave plate 20 and the polarization beam splitter 21, it is possible to adjust the ratio of the light amount branched by the polarization beam splitter 21. Similarly, it is possible to adjust the ratio of the light amount branched by the polarization beam splitter 23 using the quarter-wave plate 22.

The light amounts branched by the polarization beam splitters 21 and 23 are set to approximately 1:1. The light transmitting through the polarization beam splitter 21 is incident to each of the photodetectors $PD1_1$, $PD1_2$, and $PD1_3$ as a light detection unit via the lens. In addition, the light reflected by the polarization beam splitter 21 is incident to each of the photodetectors $PD2_1$, $PD2_2$, and $PD2_3$ via the mirror 28. The light transmitting through the polarization beam splitter 23 is incident to each of the photodetectors $PD3_1$, $PD3_2$, and $PD3_3$ via the lens. In addition, the light reflected by the polarization beam splitter 23 is incident to each of the photodetectors $PD4_1$, $PD4_2$, and $PD4_3$ via the mirror 29.

Referring to the optical system of FIG. 5, the three photodetection signals output from the photodetectors $PD1_1$, $PD1_2$, and $PD1_3$ correspond to $J_1$ to $J_3$, respectively, and the three photodetection signals output from the photodetectors $PD2_1$, $PD2_2$, $PD2_3$ correspond to $I_1$ to $I_3$, respectively. In addition, the three photodetection signals output from the photodetectors $PD3_1$, $PD3_2$, and $PD3_3$ correspond to $K_1$ to $K_3$, respectively, and the three photodetection signals output from the photodetectors $PD4_1$, $PD4_2$, $PD4_3$ correspond to $L_1$ to $L_3$, respectively.

"Electric Configuration"

Figure 16:
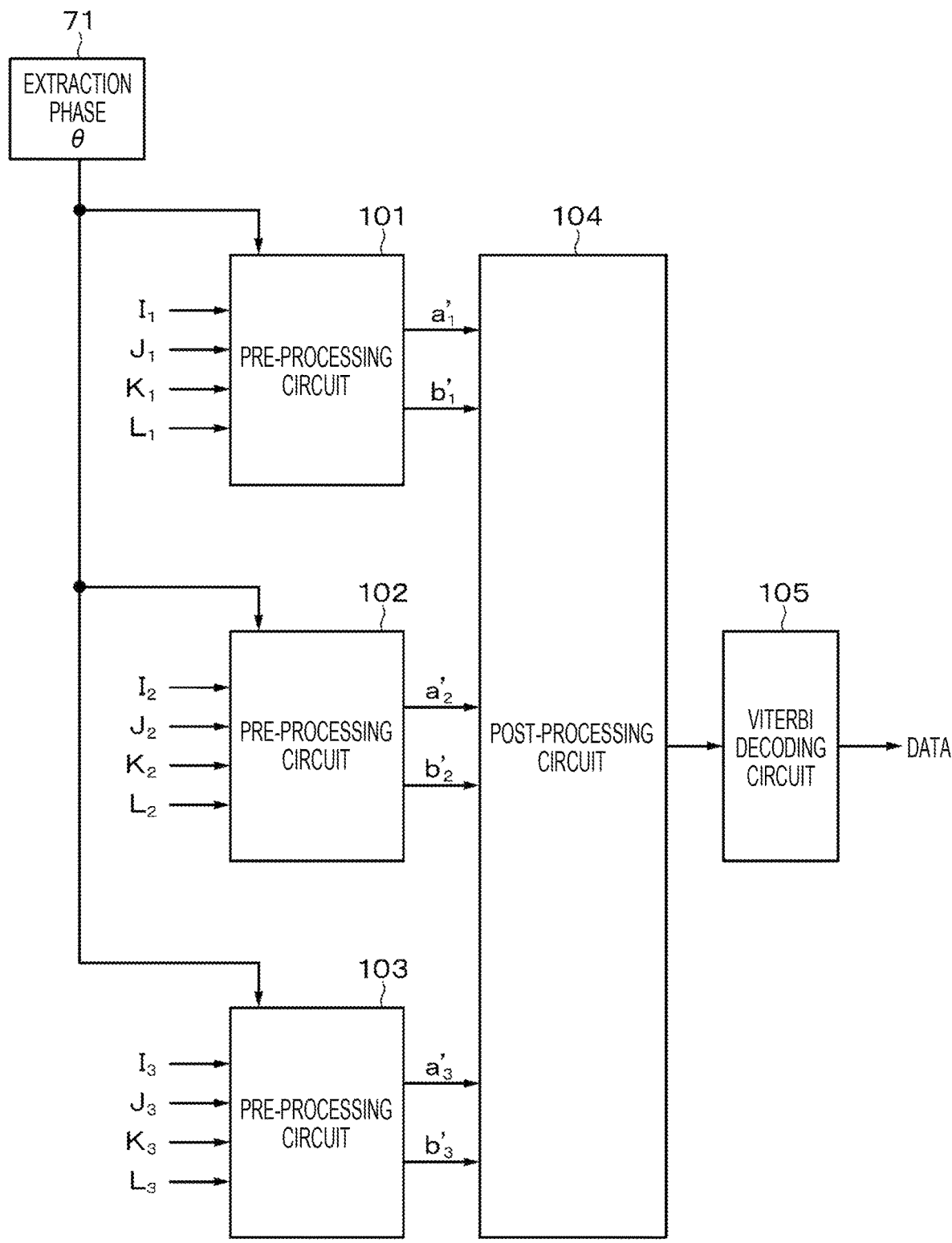
FIG. 16 is a block diagram used to describe an electric system according to the first embodiment of the present technology.

FIG. 16 illustrates an overall configuration of a reproduction signal processing circuit supplied with these photodetection signals. The photodetection signals $L_1$, $J_1$, $K_1$, and $L_1$ are supplied to the pre-processing circuit 101, the photodetection signals $L_2$, $J_2$, $K_2$, and $L_1$ are supplied to the pre-processing circuit 102, and photodetection signals $L_3$, $J_3$, $K_3$, and $L_3$ are supplied to the pre-processing circuit 103. Each of the pre-processing circuits 101, 102, and 103 performs differential operation, detection phase rotation calculation, and detection phase offset processing. The extraction phase (θ) 71 is commonly supplied to the pre-processing circuits 101, 102, and 103. In order to obtain the extraction phase 71, the addition signal of $(I=I_1+I_2+I_3)$, the addition signal of $(J=J_1+J_2+J_3)$, the addition signal of K $(=K_1+K_2+K_3)$, and an addition signal of L $(=L_1+L_2+L_3)$ are formed for the electric signals from the photodetectors $PD1_1$ to $PD4_3$. In addition, it is possible to use a configuration that forms the differential signal "a" (=I−J) and the differential signal "b" (=K−L) and calculate the output of the low pass filter using the lowpass filter.

The differential signals $a'_1$ and $b'_1$ output from the pre-processing circuit 101, the differential signals $a'_2$ and $b'_2$ output from the pre-processing circuit 102, and the differential signals $a'_3$ and $b'_3$ output from the pre-processing circuit 103 are supplied to the post-processing circuit 104. The post-processing circuit 104 performs interpolation and adaptive equalizer processing. The output of the post-processing circuit 104 is supplied to a Viterbi detector 105, and reproduction data is obtained from the Viterbi detector 105.

Figure 17:
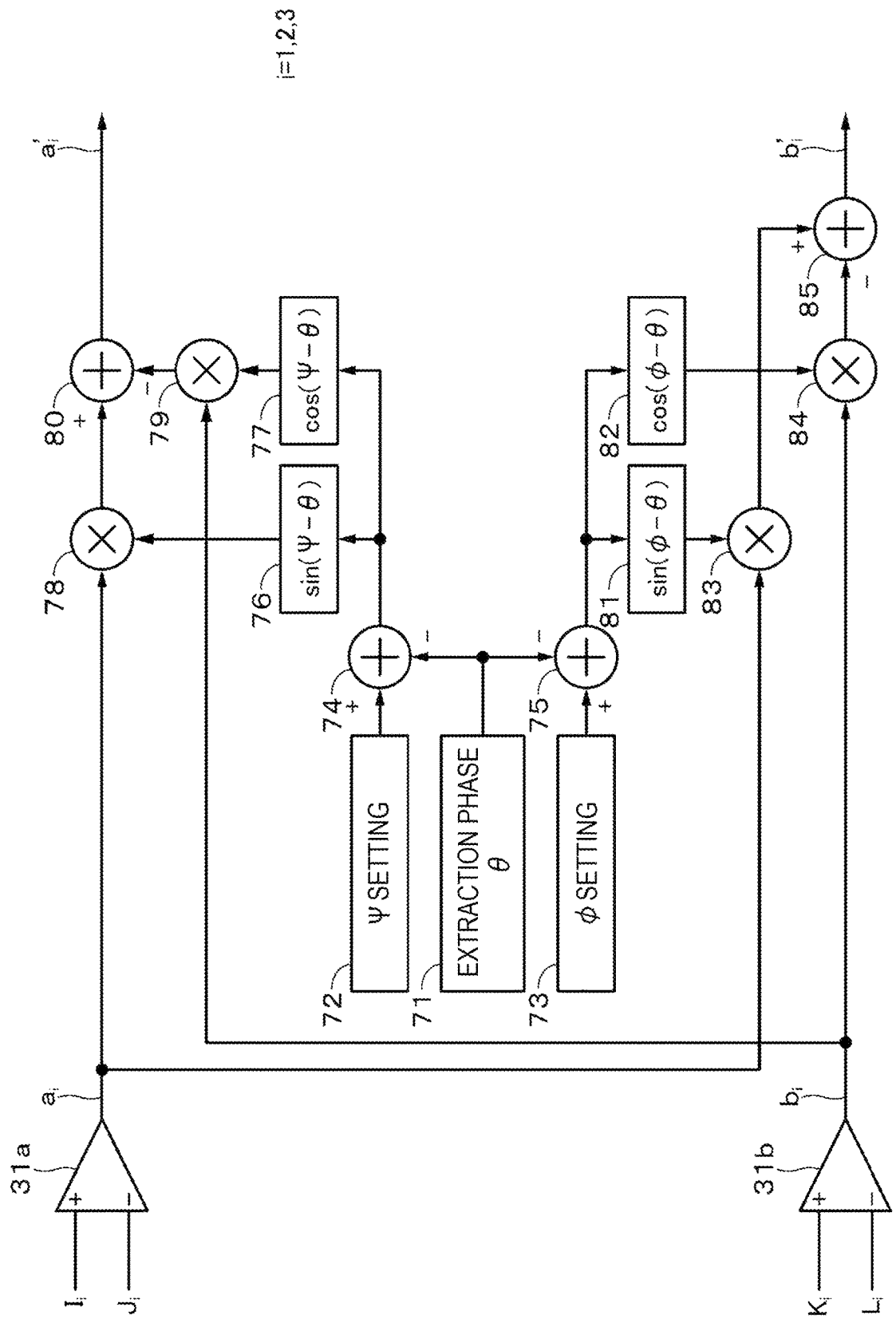
FIG. 17 is a block diagram used to describe a pre-processing circuit according to the first embodiment of the present technology.

The pre-processing circuits 101 to 103 according to the first embodiment of the present technology have configurations similar to each other (refer to FIG. 17). That is, the pre-processing circuits 101 to 103 suppress signal quality degradation caused by a variation (disturbance factor) using the extraction phase. Operation is performed for the differential signals "a" and "b" using the extraction phase. As a result, the signals "a'" and "b'" expressed in the following formulas (15) and (16) can be independently read.

[Formula 15]

$$a'\times\sin(\psi-\theta(t))-b'\times\cos(\psi-\theta(t)) \quad (15)$$

[Formula 16]

$$a'\times\sin(\phi-\theta(t))-b'\times\cos(\phi-\theta(t)) \quad (16)$$

As illustrated in FIG. 17, the photodetection signals $I_i$ and $J_i$ (where "i"=1, 2, or 3) are supplied to the subtractor 31a, and the photodetection signals $K_i$ and $L_i$ are supplied to the subtractor 31b. The subtractor 31a generates a differential signal $a_i$ (where $a_i=I_i-J_i$), and the subtractor 31b generates a differential signal $b_i$ (where $b_i=K_i-L_i$).

Offset setting circuit 72 and 73 are provided, which respectively outputs offsets φ and ψ set depending on the optical disc to be reproduced. As described above, "φ" refers to a phase difference between the mark to be read and the average phase of the signal light, and "ψ" refers to a phase difference between the crosstalk and the average phase of the signal light. These offsets are values set by user's estimation.

The output of the extraction phase 71 and the output of the offset setting circuit 72 are supplied to the subtractor 74, and the phase of (ψ−θ) is obtained from the subtractor 74. The signal generation circuits 76 and 77 generate sine waves and cosine waves, respectively, synchronized with the phase of (ψ−θ). The differential signal $a_i$ and the sine wave from the signal generation circuit 76 are supplied to the multiplication circuit 78, and the output signal of the multiplication circuit 78 is supplied to the subtractor 80. The differential signal $b_i$ and the cosine wave from the signal generation circuit 77 are supplied to the multiplication circuit 79, and the output signal of the multiplication circuit 79 is supplied to the subtractor 80. The differential signal $a'_1$ expressed in the Formula (15) is extracted at the output of the subtractor 80.

The output of the extraction phase 71 and the output of the offset setting circuit 73 are supplied to the subtractor 75, and the phase of $(\varphi-\theta)$ is obtained from the subtractor 75. The signal generation circuits 81 and 82 generate sine waves and cosine waves, respectively, synchronized with the phase of $(\varphi-\theta)$. The differential signal "a" and the sine wave from the signal generation circuit 81 are supplied to the multiplication circuit 83, and the output signal of the multiplication circuit 83 is supplied to the subtractor 85. The differential signal "b" and the cosine wave from the signal generation circuit 82 are supplied to the multiplication circuit 84, and the output signal of the multiplication circuit 84 is supplied to the subtractor 85. The differential signal $b'_i$ expressed in the Formula (16) is extracted at the output of the subtractor 85.

Figure 18:
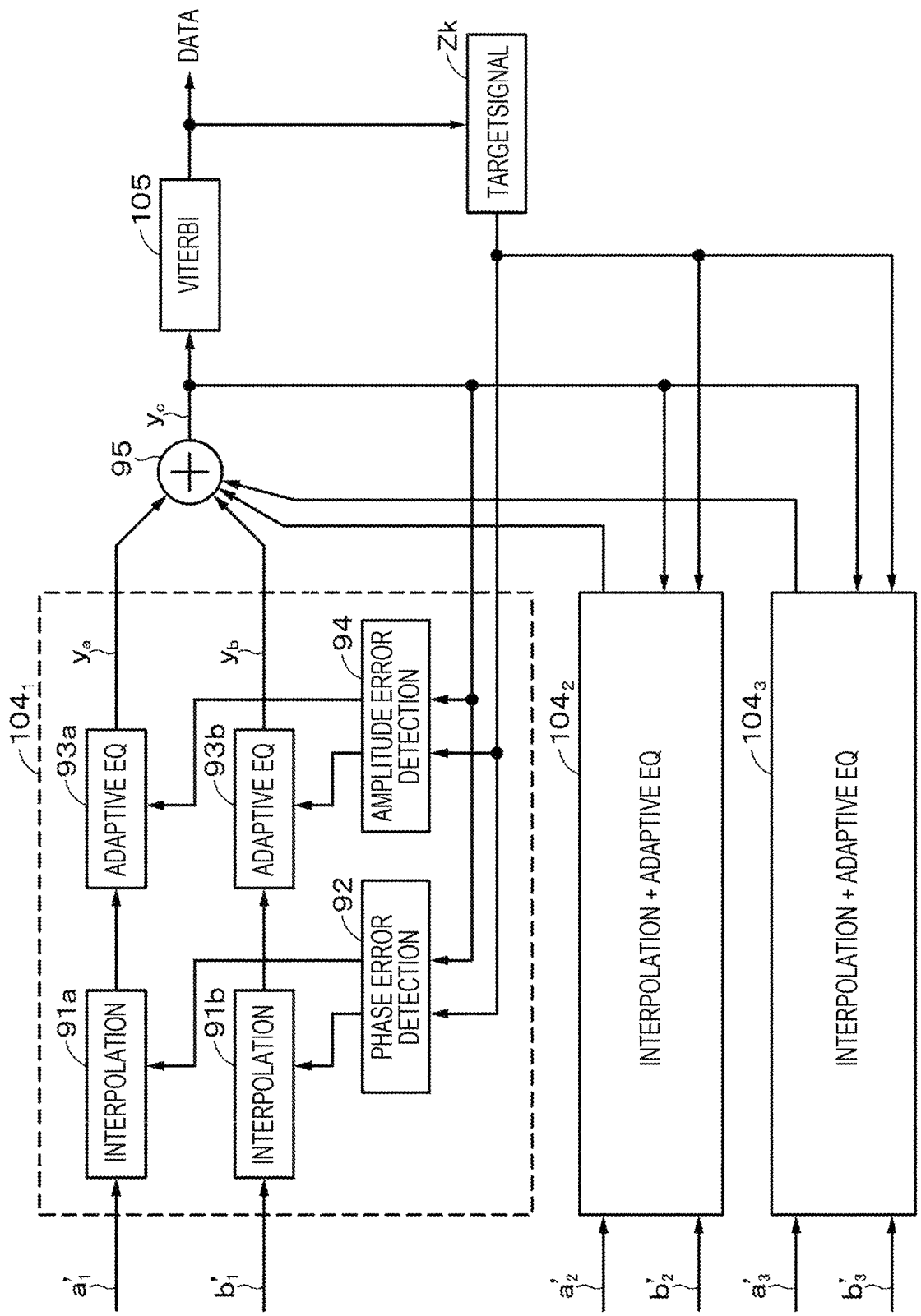
FIG. 18 is a block diagram used to describe a post-processing circuit according to the first embodiment of the present technology.

The differential signals $a'_i$ and $b'_i$ are supplied to the post-processing circuit of FIG. 18. The post-processing circuit 104 includes a post-processing circuit $104_1$, a post-processing circuit $104_2$, and a post-processing circuit $104_3$. Output signals of the post-processing circuit $104_1$, the post-processing circuit $104_2$, and the post-processing circuit $104_3$ are supplied to adder 95. Since these post-processing circuits have the same configuration, a specific configuration of only the post-processing circuit $104_1$ is illustrated in FIG. 18.

The differential signals $a'_1$ and $b'_1$ are supplied to the interpolation circuits 91a and 91b. The output of the phase error detection circuit 92 is supplied to the interpolation circuits 91a and 91b. The interpolation circuits 91a and 91b are, for example, phase locked loop (PLL) circuits and are provided for correcting a phase error. Output signals of interpolation circuits 91a and 91b are supplied to adaptive equalizers 93a and 93b. The adaptive equalizers 91a and 91b are, for example, finite impulse response (FIR) filters, and tap coefficients of the FIR filters are controlled by the output of the amplitude error detection circuit 94. The adaptive equalizer 93a performs partial response (PR) adaptive equalization processing on the basis on the differential signal $a'_1$. The adaptive equalizer 93b performs PR adaptive equalization processing on the basis of the differential signal $b'_1$.

The output signal ya of the adaptive equalizer 93a and the output signal yb of the adaptive equalizer 93b are supplied to the adder 95. The output signal yc (=ya+yb) of the adder 95 is input to the Viterbi detector 105. The Viterbi detector 105 performs maximum likelihood decoding processing for the PR equalized equalization signal yc to obtain binarized data (RF signal). The Viterbi detector having a plurality of states of continuous bits having a predetermined length as a unit and branches represented by transition between the states is used to effectively detect a desired bit sequence out of all possible bit sequences.

In an actual circuit, two registers including a register called a path metric register that stores a partial response sequence and a path metric of a signal up to that state for each state, and a register called a path memory register that stores a flow of a bit sequence up to that state are prepared. Furthermore, for each branch, an arithmetic unit called a branch metric unit for calculating a partial response sequence and a path metric of the signal at that bit is prepared.

In this Viterbi detector 105, various bit sequences can be associated with the paths passing through states one by one. In addition, a path metric between the partial response sequence passing through these paths and the actual signal (RF signal) is obtained by transition between the states of the paths, that is, by sequentially adding the aforementioned branch metric in the branch.

In addition, a path that minimizes the path metric can be selected by sequentially selecting paths with small path metrics while comparing the magnitudes of the path metrics of two or less branches that arrive in each state. By transmitting this selection information to the path memory register, information expressing the path reaching each state in a bit sequence is stored. Since the value of the path memory register converges to a bit sequence that eventually minimizes the path metric while being sequentially updated, the result thereof is output.

Furthermore, in a partial response (PR) convolution unit provided in the Viterbi detector 105, convolution processing for the result of Viterbi detection is performed to generate a target signal Zk. This target signal Zk is an ideal signal having no noise because it is a convolution of the binary detection result. For example, in the case of PR (1, 2, 2, 2, 1), an impulse response for each channel clock becomes (1, 2, 2, 2, 1). The constraint length is set to "5". Furthermore, in the case of PR (1, 2, 3, 3, 3, 2, 1), an impulse response for each channel clock becomes (1, 2, 3, 3, 3, 2, 1).

In addition, from the equalization signal yc from the adder 95 and the target signal Zk, the phase error detection circuit 92 and the amplitude error detection circuit 94 obtain a phase error and an equalization error, respectively. The tap coefficients of the FIR filters of the adaptive equalizers 93a and 93b are adaptively determined such that the square of the equalization error is minimized.

Figure 19:
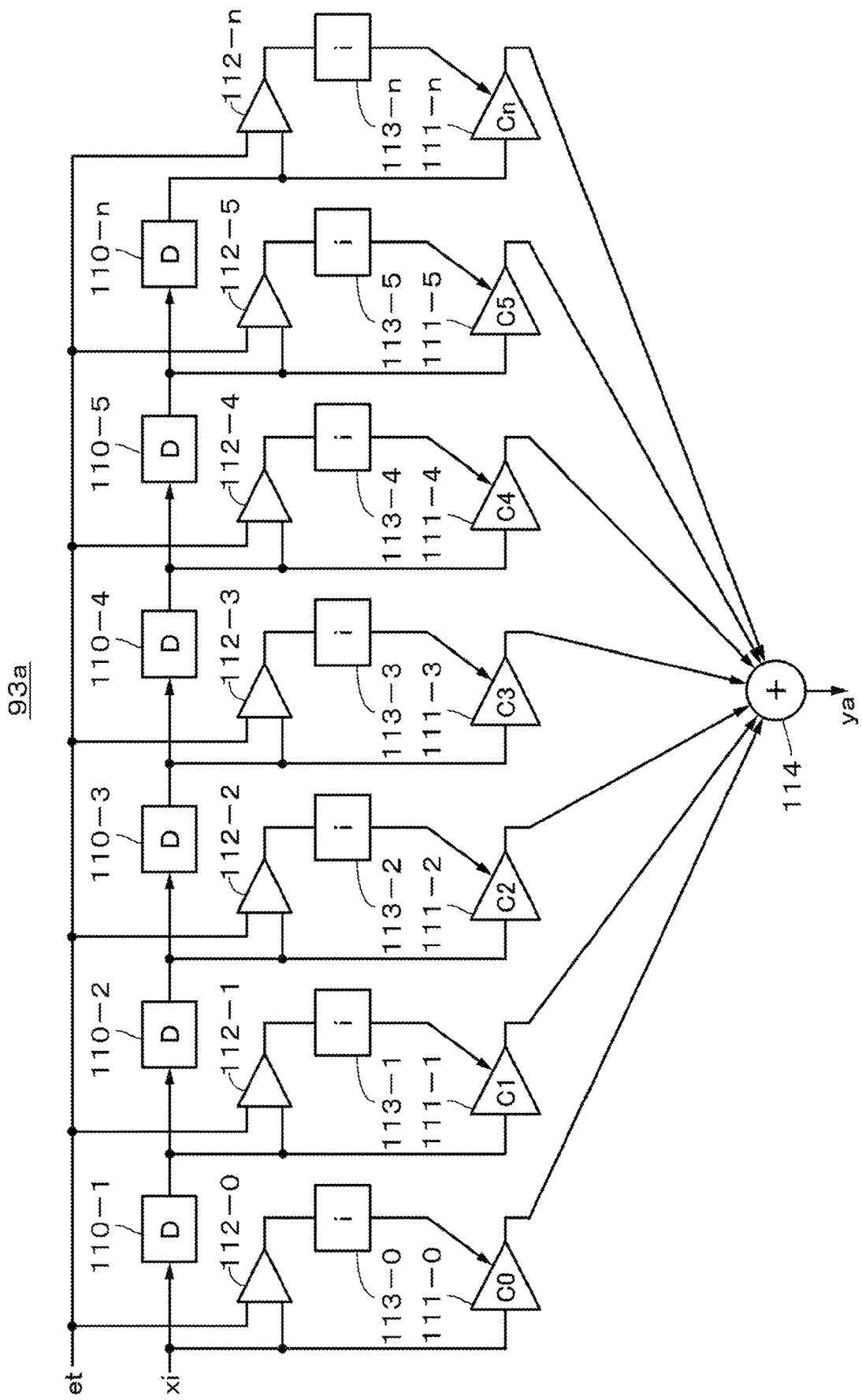
FIG. 19 is a block diagram illustrating an exemplary FIR filter.

An exemplary FIR filter included in the adaptive equalizers 93a and 93b is illustrated in FIG. 19. The adaptive equalizer 93a is a filter having (n+1) stage taps having delay elements 110-1 to 110-$n$, coefficient multipliers 111-0 to 111-$n$, and an adder 64. The coefficient multipliers 111-0 to 111-$n$ multiply the input "x" at each timing by the tap coefficients C0 to Cn. The outputs of coefficient multipliers 111-0 to 111-$n$ are added by the adder 64 and is extracted as an output ya. Initial values are set in advance for the tap coefficients.

In order to perform adaptive equalization processing, tap coefficients C0 to Cn are controlled. For this purpose, arithmetic units 112-0 to 112-$n$ that receive an equalization error "et" and each tap input and perform arithmetic operations are provided. In addition, integrators 113-0 to 113-$n$ that integrate the outputs of the arithmetic units 112-0 to 112-$n$ are provided. Each of the arithmetic units 112-0 to 112-$n$ performs, for example, calculation of $(-1*et*x)$. Here, the asterisk "*" means multiplication. The outputs of the arithmetic units 112-0 to 112-$n$ are integrated by the integrators 113-0 to 113-$n$, and the tap coefficients C0 to Cn of the coefficient multipliers 111-0 to 111-$n$ are changed and controlled depending on the integration result. Note that integration in the integrators 113-0 to 113-$n$ is performed in order to adjust responsiveness of the adaptive coefficient control.

"Effects of First Embodiment"

According to the first embodiment described above, it is expected that the signal yb approaches the crosstalk component from the land because a phase shift caused by a variation factor generated by a minute unevenness or the like on the disc surface is corrected. It is expected that the signal yc approaches the signal of the groove from which the crosstalk component is removed. In this manner, it is expected to improve the signal quality through adaptive equalization.

A result of exemplary simulation according to an embodiment of the present technology (FIG. 20) will be described. The simulation conditions are set as follows.

Disc capacity: 33.4 GB
Tp=0.32 μm (track pitch between grooves)
Groove depth: λ/8
Mark reflectance: 0.3 (no phase)
Groove isolated recording (not recorded on the land), example of groove reproduction
Evaluation index: MLSE A maximum likelihood sequence error (MLSE) is obtained by calculating an index corresponding to an error probability by using a difference of an actual signal level from a target level set using Viterbi detected data. The smaller value of MLSE indicates the better reproduction.

Figure 20:
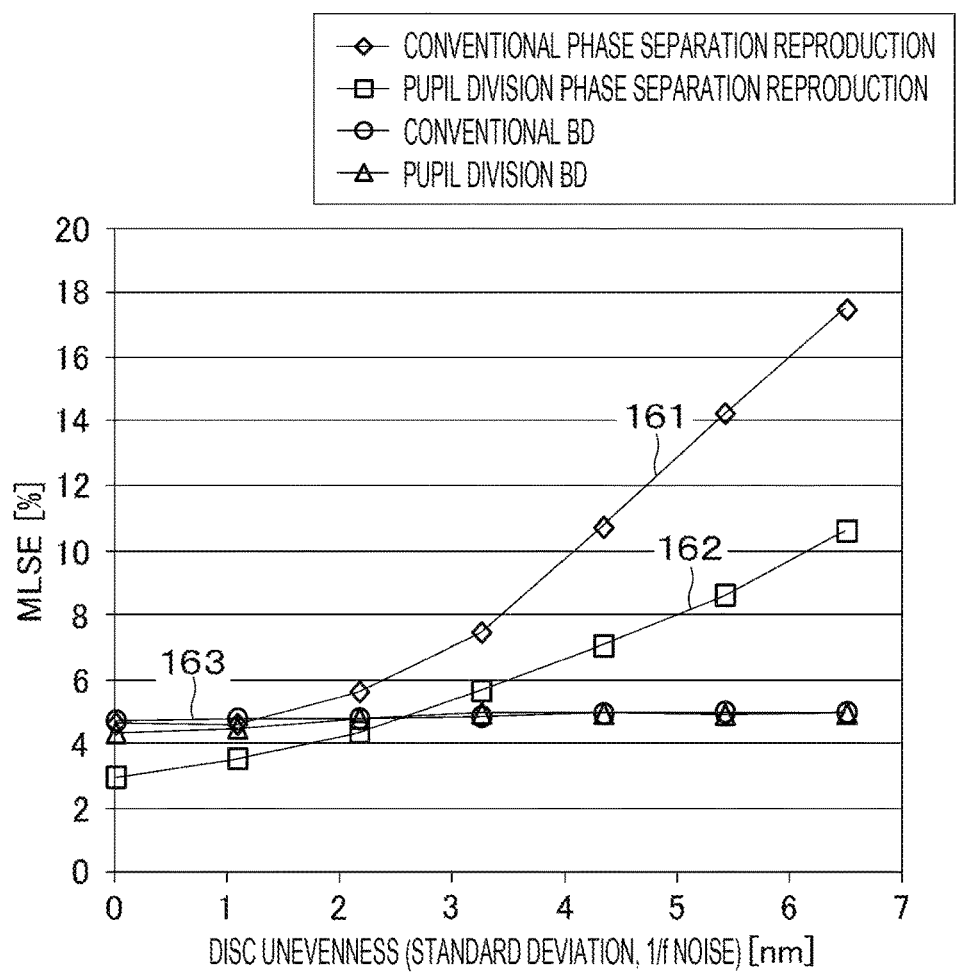
FIG. 20 is a graph showing a simulation result.

FIG. 20 is a graph showing a simulation result. The abscissa refers to a standard deviation of the disc unevenness, and the ordinate refers to the MLSE. In FIG. 20, the characteristic 161 indicates a value of MLSE in the case of a conventional homodyne detection method, and the characteristic 162 indicates a value of MLSE of the first embodiment of the present technology. In addition, the characteristic 163 indicates a case of a conventional Blu-ray Disc (registered trademark) (BD), and the characteristic 164 indicates a case where a holographic optical element is inserted, and processing is performed by an adaptive equalizer, similarly to the case of the conventional Blu-ray Disc (registered trademark) (BD).

In the case of the conventional Blu-ray Disc (registered trademark) (BD), there is no influence from a phase variation caused by the unevenness on the disc surface. In comparison, in the homodyne detection method, the quality of the reproduction signal is degraded due to influence from the phase variation. However, according to the first embodiment of the present technology, it is possible to further reduce the influence of such a phase variation.

Figure 21:
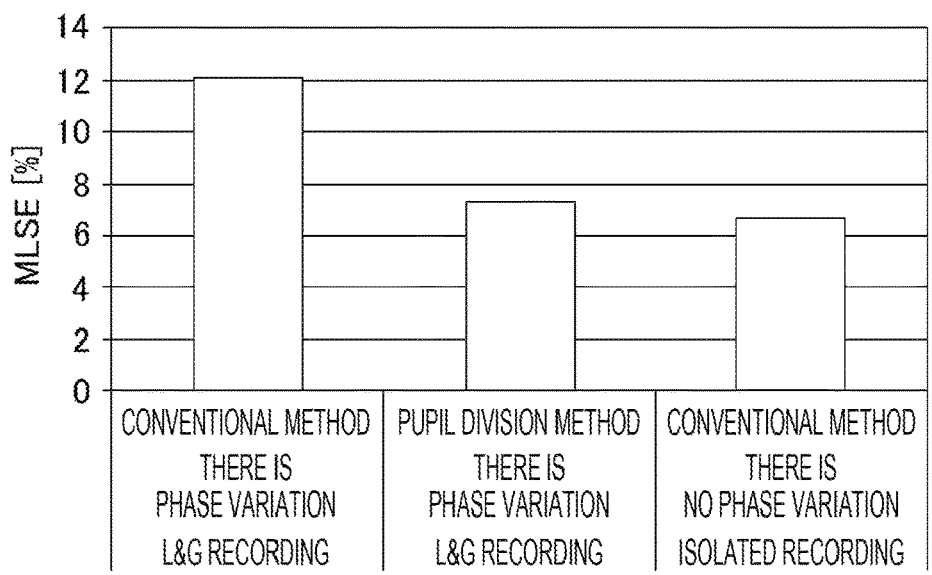
FIG. 21 is a graph showing a simulation result.

A result of another exemplary simulation according to an embodiment of the present technology (FIG. 21) will be described. The simulation conditions are set as follows.
Disc capacity: 35 GB
Tp=0.16 μm (track pitch between land and groove)
Groove depth: λ/8
Mark reflectance: 0.3 (no mark phase)
Example of Groove Reproduction
Evaluation index: MLSE FIG. 21 shows comparison of MLSE values between the case of the conventional homodyne detection method (in a case where there is a phase variation, and recording is performed on lands and grooves), the case of the first embodiment of the present technology (when there is a phase variation, and recording is performed on lands and grooves), and the case of the conventional homodyne detection method (when there is no phase variation, and the groove is reproduced with only recording on the groove (isolated recording)). As recognized from FIG. 21, signal quality degradation caused by a phase variation can be improved to the same extent as the conventional homodyne detection method (without a phase variation, only with groove recording (isolated recording).

"First Modification of First Embodiment"

Figure 22:
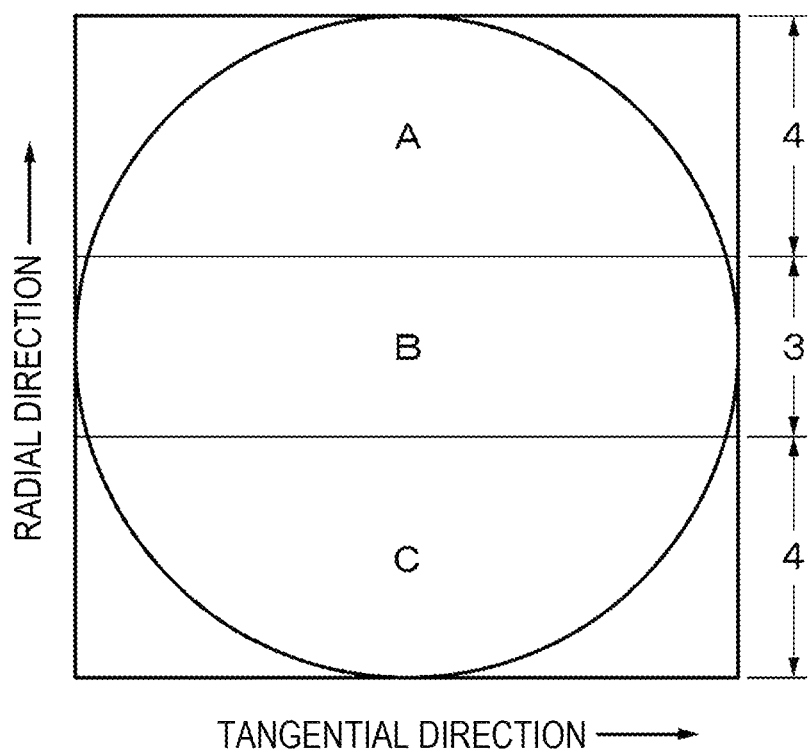
FIG. 22 is a schematic diagram used to describe another exemplary light dividing element.
Figure 23:
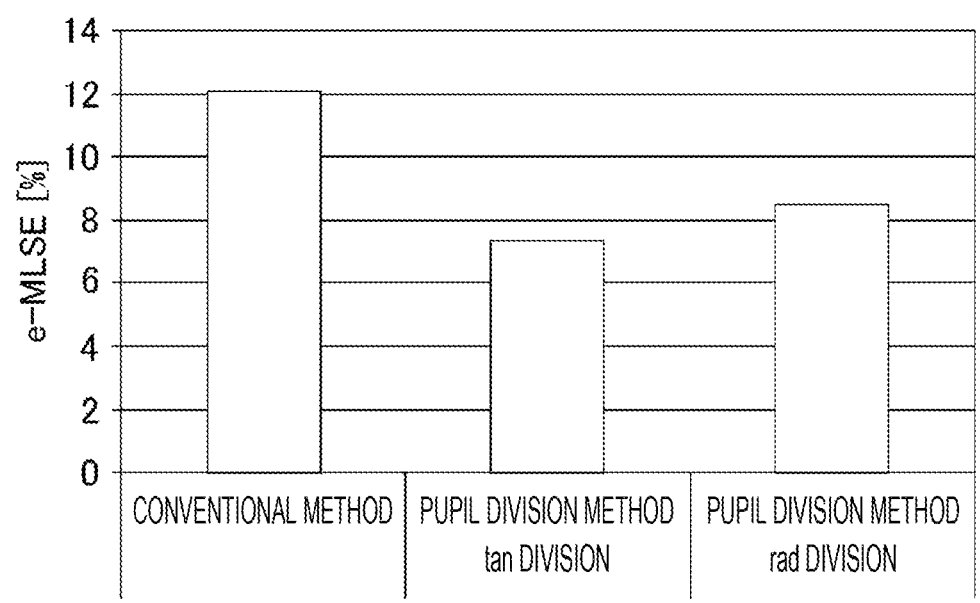
FIG. 23 is a graph showing a simulation result.

In the aforementioned description, a pupil of the return light reflected by the recording layer 3 of the disc 1 is divided in the tangential direction. However, as illustrated in FIG. 22, the pupil may be divided in the radial direction. For example, the pupil is divided into three regions A, B, and C in the radial direction. The ratio of three divisions is set to, for example, (4:3:4). FIG. 23 shows a simulation result in a case where processing similar to that of the first embodiment is performed using a holographic optical element that bisects the pupil in the radial direction.

The simulation conditions are set as follows.
Disc capacity: 35 GB
Tp=0.16 μm (track pitch between land and groove)
Groove depth: λ/8
Mark reflectance: 0.3 (no mark phase)
Example of Groove Reproduction
Evaluation index: e-MLSE FIG. 23 shows comparison between the e-MLSE value of the conventional homodyne detection method, the e-MLSE value obtained by dividing the pupil in the tangential direction (tangential division), similarly to the first embodiment of the present technology, and the e-MLSE value obtained by dividing the pupil in the radial direction (radial division). As recognized from FIG. 23, even in a case where the pupil is divided in the radial direction, it is possible to perform signal reproduction better than the conventional homodyne detection method.

"Second Modification of First Embodiment"

Figure 24:
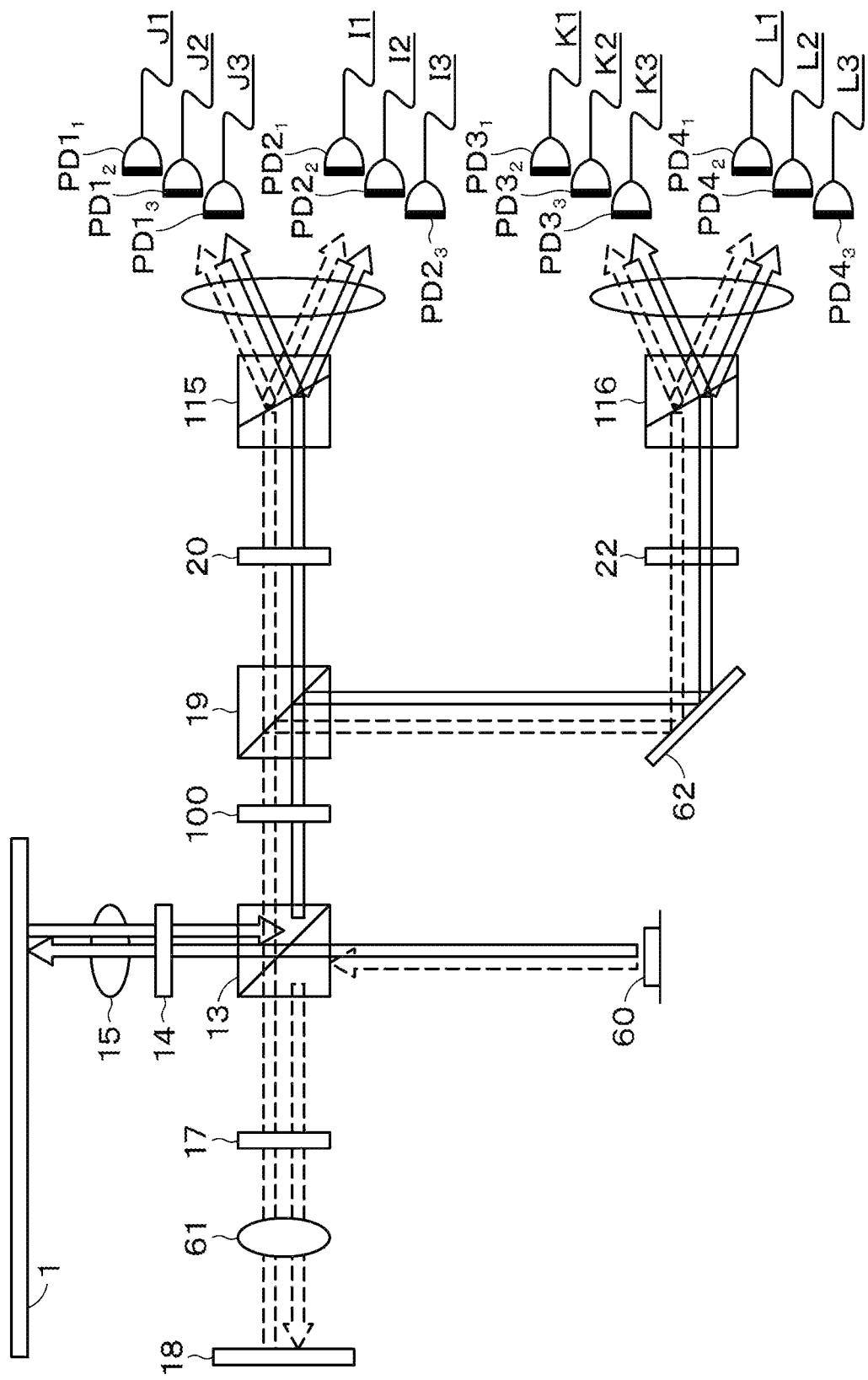
FIG. 24 is a schematic diagram used to describe an optical system according to a modification of the first embodiment.

Instead of the polarization beam splitters 21 and 23 and the mirrors 28 and 29 of the optical system of the first embodiment (refer to FIG. 15), Wollaston prisms 115 and 116 may be employed as illustrated in FIG. 24. Light having a phase difference caused by the Wollaston prisms 115 and 116 is respectively obtained. The output light of the Wollaston prisms 115 and 116 is respectively converted into electric signals using the photodetectors $PD1_1$ to $PD4_3$. In addition, through signal processing similar to that described above, a reproduction signal is obtained.

"Third Modification of First Embodiment"

Figure 25:
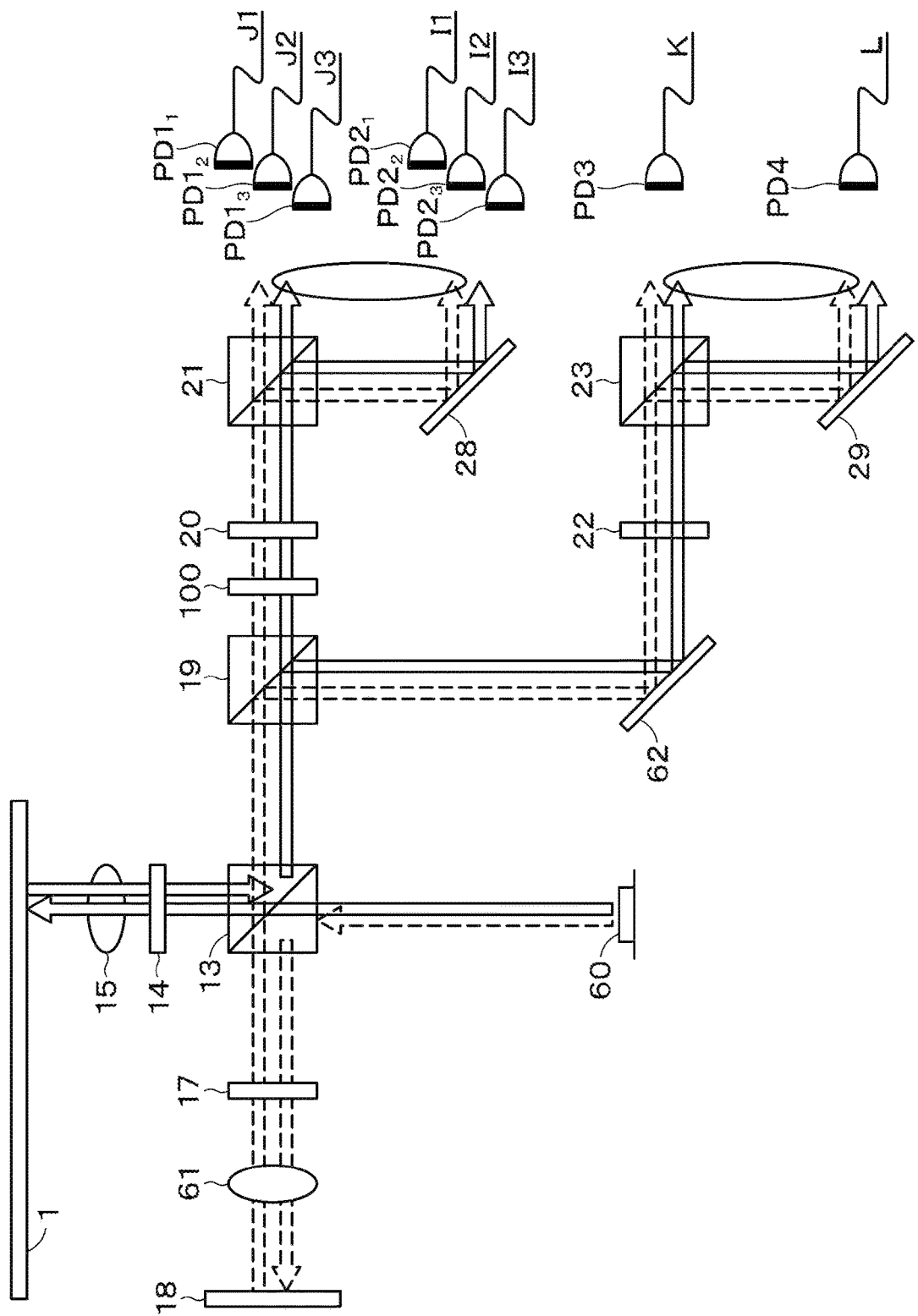
FIG. 25 is a schematic diagram used to describe an optical system according to a modification of the first embodiment.

As illustrated in FIG. 25, the holographic optical element 100 may be arranged between the output side of the half beam splitter 19 and the half-wave plate 20. In the configuration of FIG. 15, the holographic optical element 100 is arranged between the polarization beam splitter 13 and the half beam splitter 15. Therefore, in the configuration of FIG. 25, the pupil of the superposed light transmitting through the half beam splitter 19 is trisected.

The light transmitting through the polarization beam splitter 21 is received by three photodetectors $PD1_1$, $PD1_2$, and $PD1_3$, and the light reflected by the polarization beam splitter 21 is received by three photodetectors $PD2_1$, $PD2_2$, and $PD2_3$. Meanwhile, since the light transmitting through the polarization beam splitter 23 is not divided, it is received by the photodetector PD3. Since the light reflected by the polarization beam splitter 23 is not divided, it is received by the photodetector PD4.

Three differential signals are obtained by calculating the photodetection signals of the photodetectors $PD1_1$ to $PD2_3$. In addition, one differential signal is obtained by computing the photodetection signals of the photodetectors PD3 and PD4. By applying the aforementioned adaptive equalizer processing to these differential signals, a reproduction signal is obtained. In this case, the signal K is used as the signal Ki, and the signal L is used as the signal Li.

Note that a reference light servo control in which the mirror 18 that reflects the reference light is displaced in parallel to the optical axis of the reference light using an actuator may be employed. For example, the servo control is performed such that the differential signal formed from the photodetection signals of the photodetectors PD3 and PD4 is set to a target value (for example, zero).

"Fourth Modification of First Embodiment"

Figure 26:
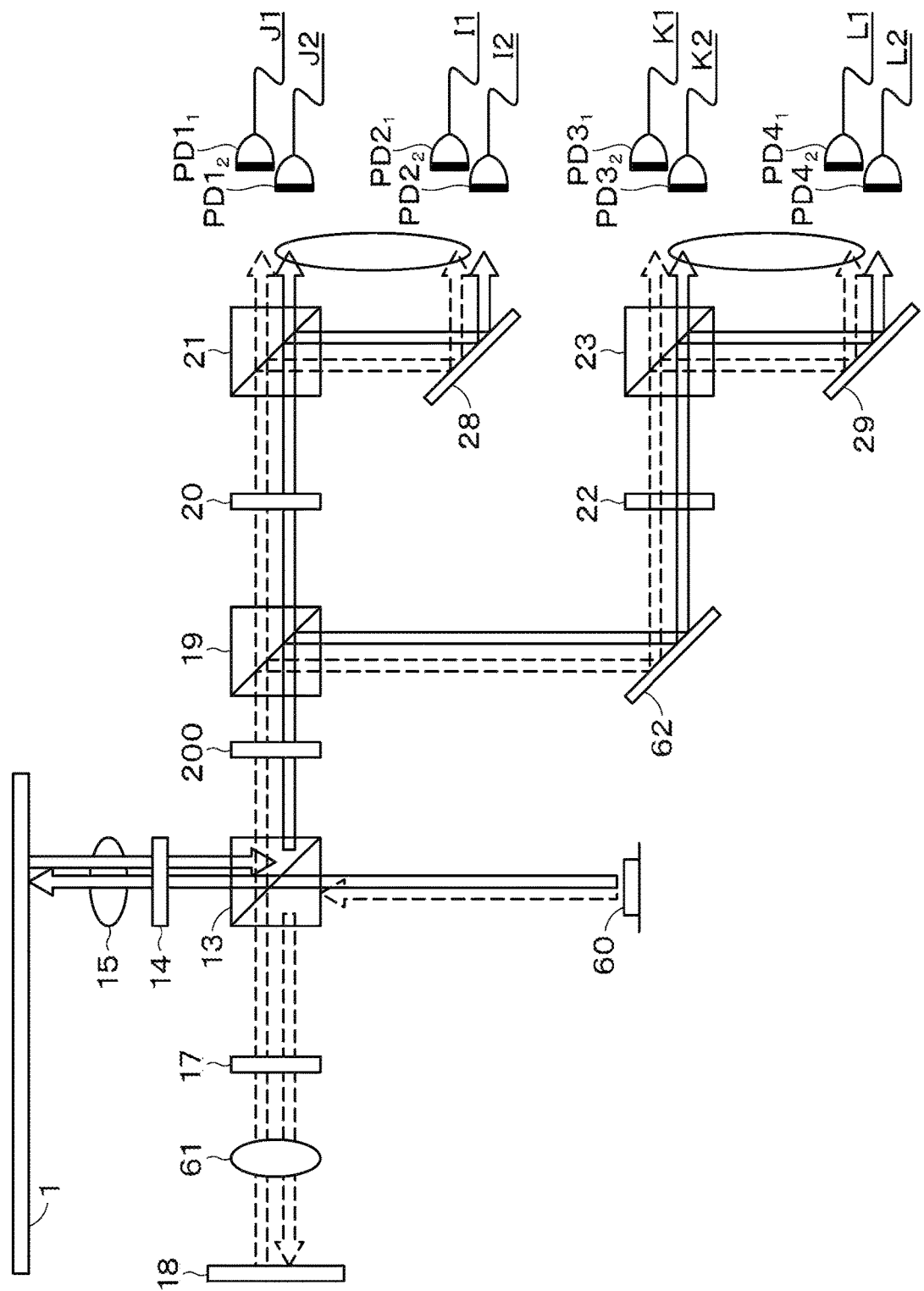
FIG. 26 is a schematic diagram used to describe an optical system according to a modification of the first embodiment.

The light dividing element may bisect the superposed light. As illustrated in FIG. 26, the holographic optical element 200 is arranged between the polarization beam splitter 13 and the half beam splitter 19. The holographic optical element 200 has three regions divided in the tangential direction, similarly to the aforementioned holographic optical element 100. Similarly to the holographic optical element 100, the division ratio is also set to (4:3:4).

In addition, the photodetection signal (Channel 2) of the light component included in the center region B is treated as the first channel, and a signal obtained by adding the photodetection signals (Channel 1 and Channel 3) of the light component included in each of the left and right regions A and B is treated as a second channel. Note that the added signal may be obtained by adding signals received from other photodetectors, or light components included in the regions B and C may be received by a common photodetector.

For example, two photodetection signals $J_1$ and $J_2$ are output from the photodetectors $PD1_1$ and $PD1_2$, and two photodetection signals $I_1$ and $I_2$ are output from the photodetectors $PD2_1$ and $PD2_2$. In addition, two photodetection signals $K_1$ and $K_2$ are output from the photodetectors $PD3_1$ and $PD3_2$, and two photodetection signals $L_1$ and $L_2$ are output from the photodetectors $PD4_1$ and $PD4_2$.

Four differential signals are obtained by computing the photodetection signals of the photodetectors $PD1_1$ to $PD4_2$. By applying the aforementioned adaptive equalizer processing to these differential signals, a reproduction signal is obtained.

"Fifth Modification of First Embodiment"

Figure 27:
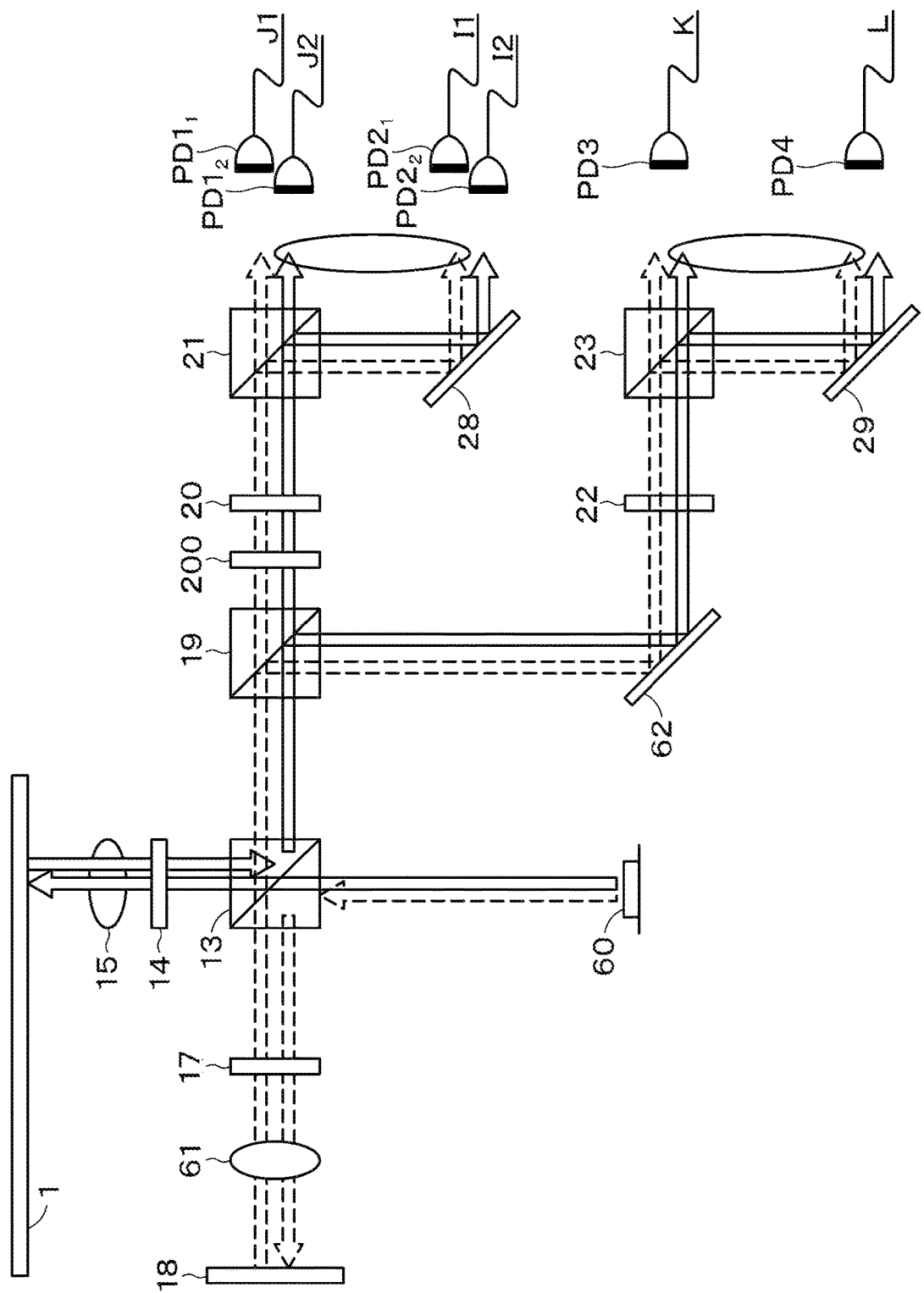
FIG. 27 is a schematic diagram used to describe an optical system according to a modification of the first embodiment.

As illustrated in FIG. 27, the holographic optical element 200 may be arranged between the output side of the half beam splitter 19 and the half-wave plate 20. Therefore, in the configuration of FIG. 27, the pupil of the superposed light transmitting through the half beam splitter 19 is bisected.

The light transmitting through the polarization beam splitter 21 is received by the two photodetectors $PD1_1$ and $PD1_2$, and the light reflected by the polarization beam splitter 21 is received by the two photodetectors $PD2_1$ and $PD2_2$. Meanwhile, since the light transmitting through the polarization beam splitter 23 is not divided, it is received by the photodetector PD3. Since the light reflected by the polarization beam splitter 23 is not divided, it is received by the photodetector PD4.

Two differential signals are obtained by calculating the photodetection signals of the photodetectors $PD1_1$ and $PD2_3$. In addition, one differential signal is obtained by computing the photodetection signals of the photodetectors PD3 and PD4. By applying the aforementioned adaptive equalizer processing to these differential signals, a reproduction signal is obtained.

Note that a reference light servo control in which the mirror 18 that reflects the reference light is displaced in parallel to the optical axis of the reference light using an actuator may be employed. For example, the servo control is performed such that the differential signal formed from the photodetection signals of the photodetectors PD3 and PD4 is set to a target value (for example, zero).

Figure 28:
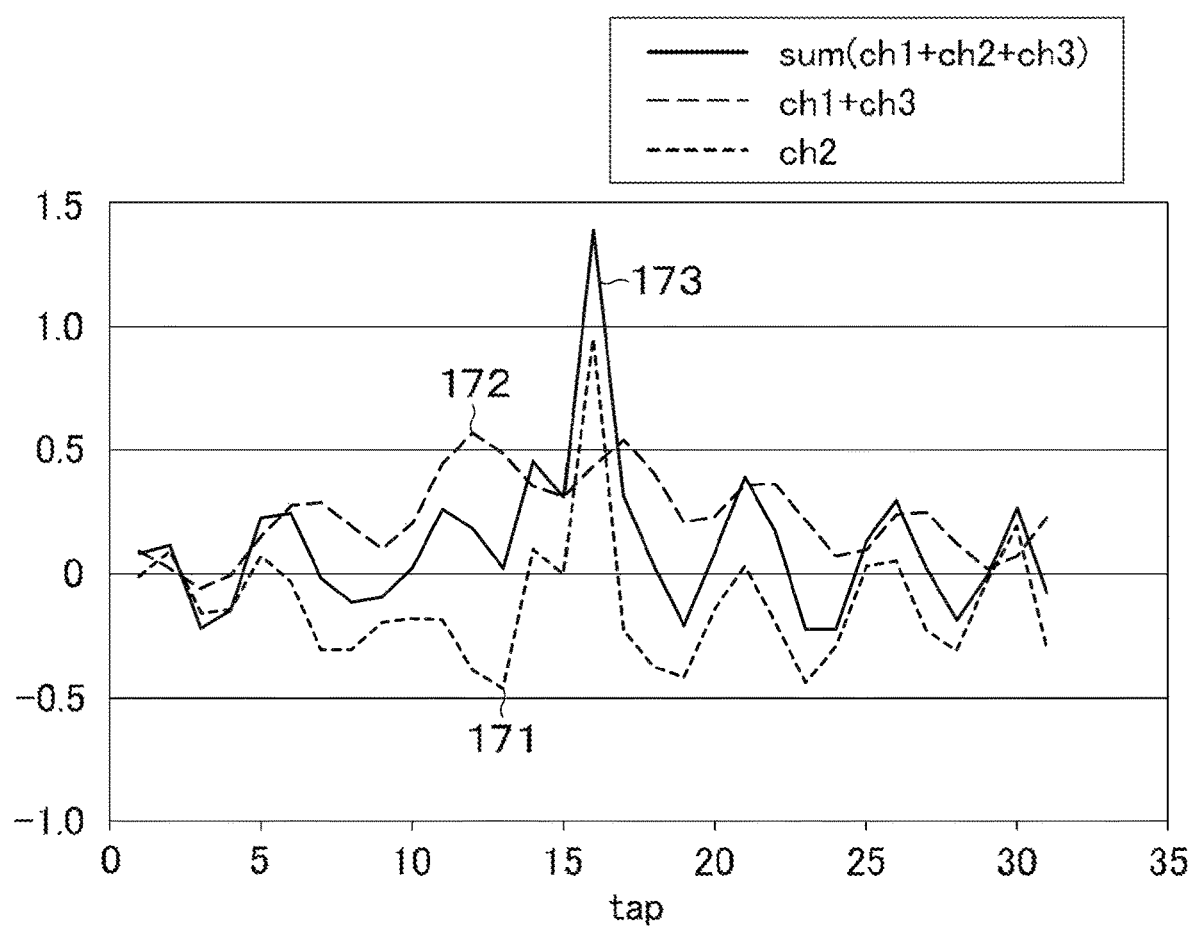
FIG. 28 is a graph showing an exemplary tap coefficient of the FIR filter according to the first embodiment.

FIG. 28 shows an exemplary tap coefficient of the FIR filter in a case where a reproduction signal is formed by the adaptive equalizer processing using the optical reproduction system of FIG. 27. The abscissa refers to a tap position, and the ordinate refers to the value of the tap coefficient. The line 171 is a line that links the values of the tap coefficients of the first channel (=Channel 2), and the line 172 is a line that links the values of the tap coefficients of the second channel (=Channel 1+Channel 3) (right and left regions). Furthermore, the line 173 indicates a value obtained by adding the values of the two tap coefficients.

The tap coefficient of (Channel 1+Channel 3) indicates a tendency of the low pass filter.

The Channel 2 corresponding to the central region indicates a tendency of canceling the S function and the (Channel 1+Channel 3). It is conceived that this means phase variation (noise) canceling.

The sum of the tap coefficients looks like a S function on average. Therefore, since the phase noise of the lower frequency side can be cut off, the phase separation detection is performed satisfactorily.

4. Second Embodiment

Figure 29:
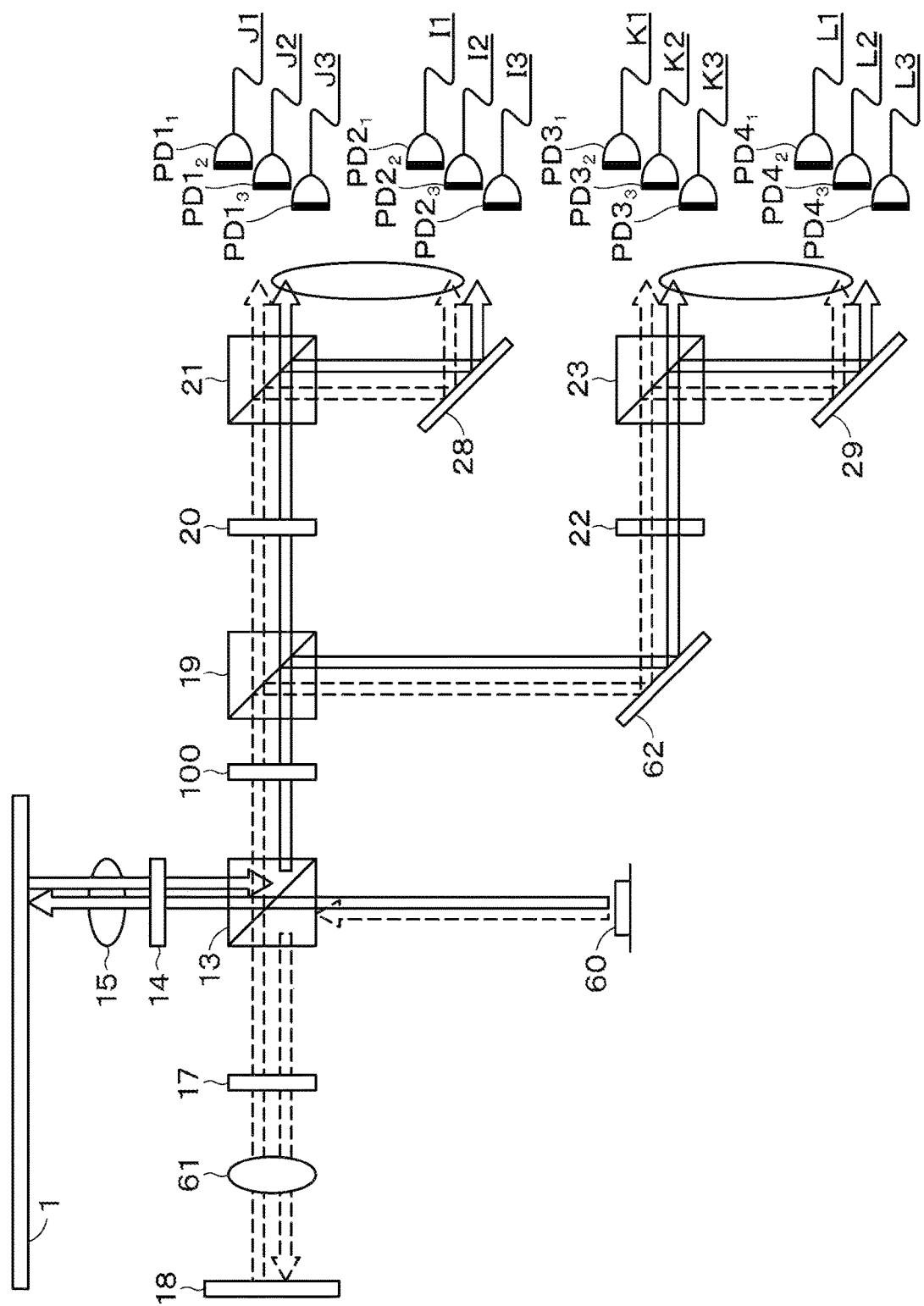
FIG. 29 is a schematic diagram used to describe an optical system according to a second embodiment of the present technology.

Similarly to the first embodiment, according to the second embodiment, the pupil division is performed, and the phase variation component is removed by the reference light servo control. FIG. 29 illustrates an optical reproduction system according to the second embodiment. That is, the optical reproduction system has a configuration similar to that of the first embodiment, and the three superposed light beams divided by the holographic optical element 100 are received by the photodetectors $PD1_1$ to $PD4_3$.

Figure 30:
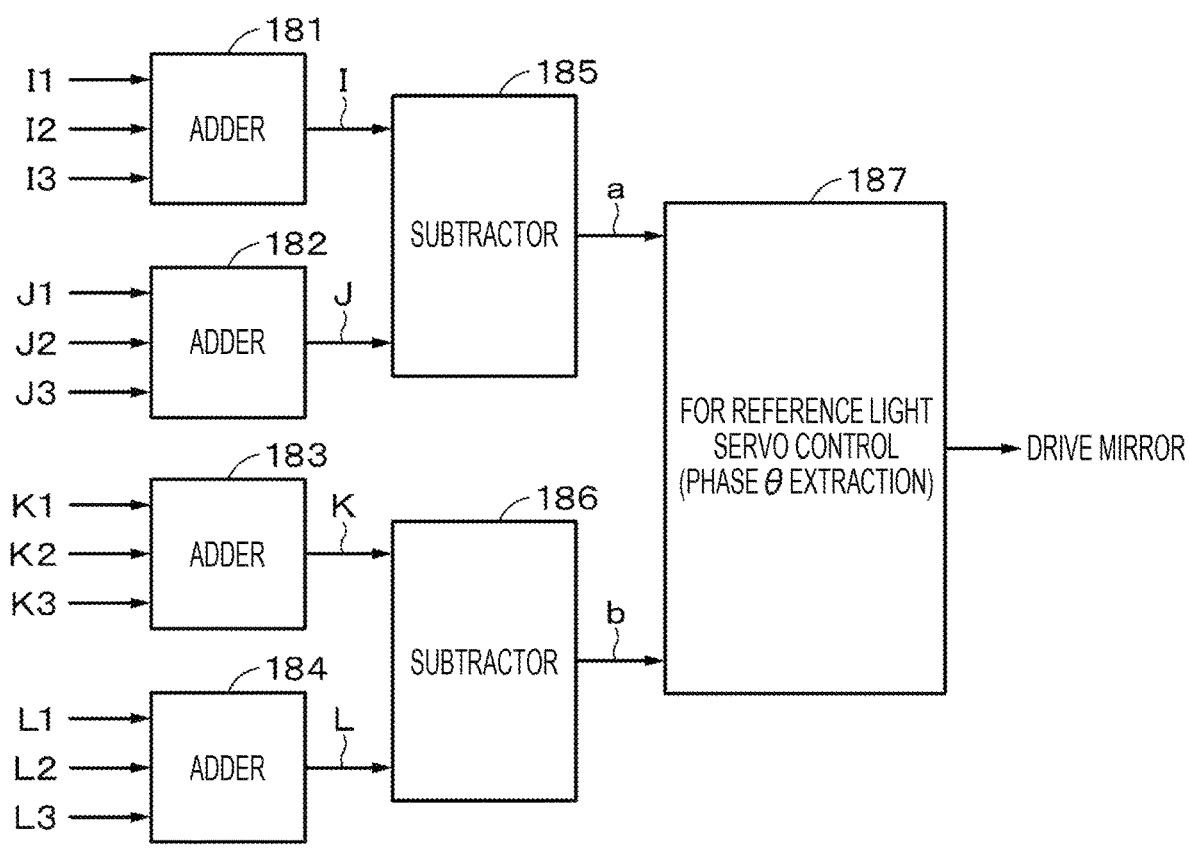
FIG. 30 is a block diagram used to describe an electric system according to the second embodiment of the present technology.

FIG. 30 illustrates an electrical configuration for processing electric signals from the photodetectors $PD1_1$ to $PD4_3$. The signals $I_1$, $I_2$, and $I_3$ are supplied to the adder 181, and the addition process of $(I=I_1+I_2+I_3)$ is performed. In addition, the signals $J_1$, $J_2$, and $J_3$ are supplied to the adder 182, and the addition process of $(J=J_1+J_2+J_3)$ is performed. Similarly, the adder 183 performs the addition processing of $K (=K_1+K_2+K_3)$, and the adder 184 performs the addition processing of $L (=L_1+L_2+L_3)$.

The output I of the adder 181 and the output J of the adder 182 are supplied to the subtractor 185, and a differential signal "a (=I−J)" is obtained. The output K of the adder 183 and the output L of the adder 184 are supplied to the subtractor 186, and the differential signal "b (=K−L)" is obtained. The differential signals "a" and "b" are supplied to a phase (θ) extraction circuit 187 for a reference light servo control. The output of the phase (θ) extraction circuit 187 is supplied to the actuator, so that the mirror 18 is displaced. As the phase (θ) extraction circuit 187, the aforementioned lowpass filter can be used to calculate the output of the lowpass filter. The second embodiment is characterized in that it is possible to add a phase extraction function for a reference light servo control that suppresses a low-frequency phase variation such as surface shaking without changing the optical system.

"Modification of Second Embodiment"

Figure 31:
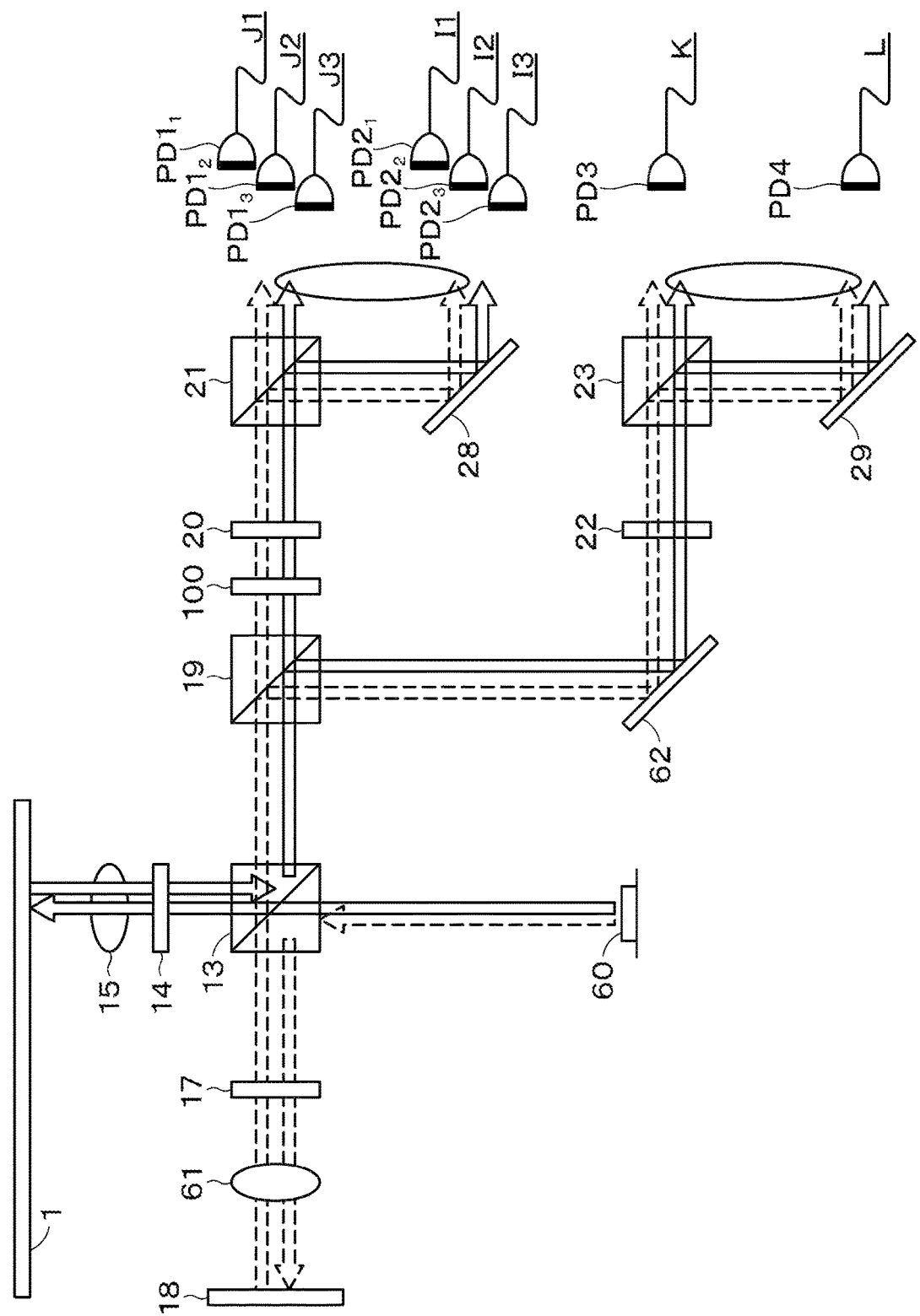
FIG. 31 is a schematic diagram used to describe an optical system according to a modification of the second embodiment.

As illustrated in FIG. 31, only the light transmitting through the polarization beam splitter 19 may be divided by the holographic optical element 100. The pupil division is not performed for the light reflected by the polarization beam splitter 19. Therefore, the light is converted into electric signals by eight photodetectors ($PD1_1$, $PD1_2$, ..., photodetector PD3, photodetector PD4).

Figure 32:
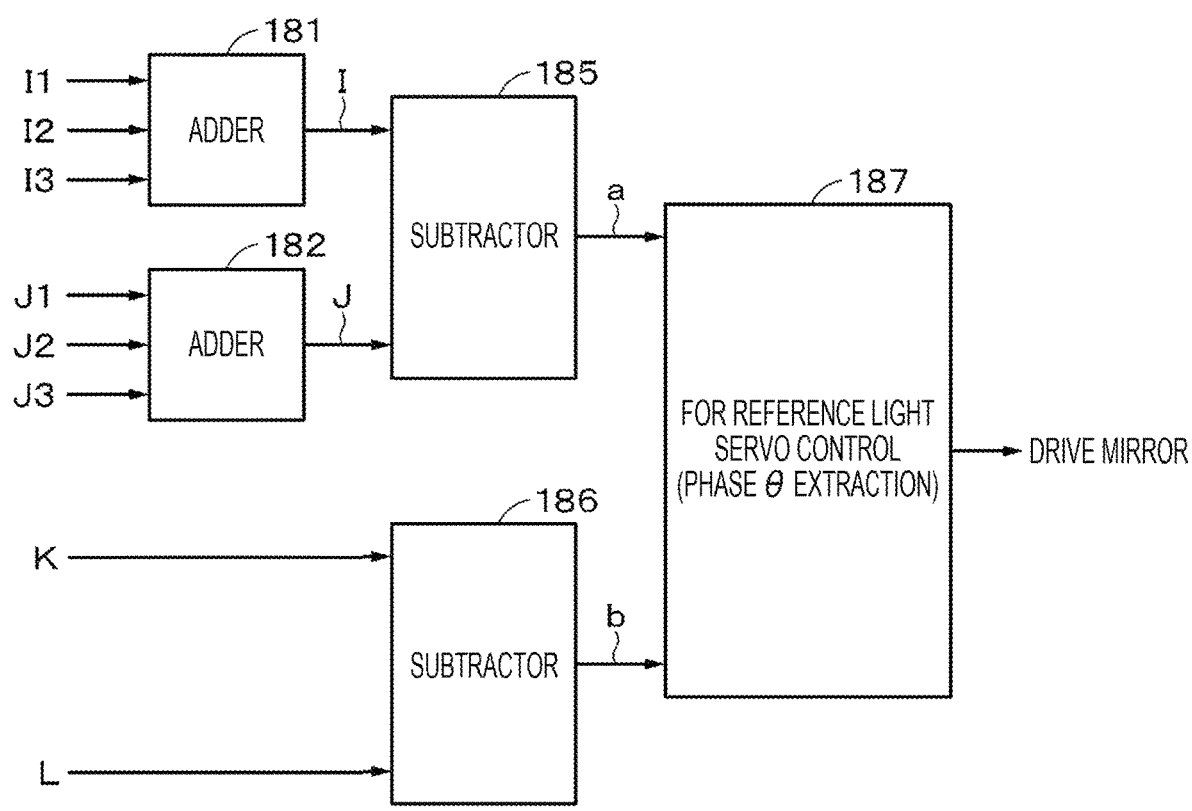
FIG. 32 is a block diagram used to describe an electric system according to a modification of the second embodiment.

FIG. 32 illustrates an electrical configuration for processing electric signals from the photodetectors $PD1_1$ to PD4. The signals $I_1$, $I_2$, and $I_3$ are supplied to the adder 181, and the addition processing of $(I=I_1+I_2+I_3)$ is performed. In addition, the signals $J_1$, $J_2$, and $J_3$ are supplied to the adder 182, and the addition processing of $(J=J_1+J_2+J_3)$ is performed.

The output I of the adder 181 and the output J of the adder 182 are supplied to the subtractor 185, and a differential signal "a (=I−J)" is obtained. The signal K and signal L are supplied to the subtractor 186, and a differential signal "b (=K−L)" is obtained. The differential signals "a" and "b" are supplied to the phase (θ) extraction circuit 187 for a reference light servo control. The output of the phase (θ) extraction circuit 187 is supplied to the actuator, so that the mirror 18 is displaced. As the phase (θ) extraction circuit 187, the aforementioned lowpass filter may be used to calculate the output of the lowpass filter.

Note that, even in the second embodiment, a holographic optical element that bisects the pupil may also be employed, and a holographic optical element that divides the pupil in the radial direction may also be employed.

5. Modification

While the embodiments of the present technology have been described in details hereinbefore, the present technology is not limited to each of the aforementioned embodiments, but various modifications based on the technical concept of the present technology may be possible. For example, the laser light source may emit a wavelength other than 405 nm.

In addition, the configuration, methods, processes, shapes, materials, numerical values, and the like of the aforementioned embodiments may be combined with each other without departing from the spirit and scope of the present technology.

Note that the present technology may have the following configurations.

(1)

A reproduction apparatus that irradiates a recording medium having both a land and a groove to which a signal is recorded with light emitted from a light source to obtain a signal light that contains recording signals of both the land and the groove and generate reference light from the light emitted from the light source, forms superposed light by superposing the signal light and the reference light, and divides a cross section of the superposed light into a plurality of regions in a tangential direction and/or in a radial direction using a light dividing element, the reproduction apparatus including:

an optical system configured to generate each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

an optical receiver configured to output a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light; and a reproduction signal generation circuit configured to compute a differential signal a as a difference between the photodetection signal (I) and the photodetection signal (J) and a differential signal b as a difference between the photodetection signal (K) and the photodetection signal (L), and obtain a reproduction signal by computation from the differential signals a and b.

(2)

The reproduction apparatus according to (1), in which, assuming that "N" denotes the number of divisions of the light dividing element, the optical receiver outputs the photodetection signals (I) and (J), each of whose number is equal to or smaller than "N", and the photodetection signals (K) and (L), each of whose number is equal to or smaller than "N".

(3)

The reproduction apparatus according to (1), in which, assuming that "N" denotes the number of divisions of the light dividing element, signals are output to one of a set of the photodetection signals (I) and (J) and a set of the photodetection signals (K) and (L), the number of signals being equal to or smaller than "N".

(4)

The reproduction apparatus according to (1), in which the differential signals a and b are respectively supplied to adaptive equalizer circuits, and outputs of the adaptive equalizer circuits are combined to form a reproduction signal.

(5)

The reproduction apparatus according to claim 4, in which the adaptive equalizer circuit obtains an equalization error from an equalization target signal and an equalization signal, and supplies the equalization error as a control signal for adaptive equalization.

(6)

The reproduction apparatus according to (1), in which a phase offset is applied to the differential signals a and b in advance.

(7)

The reproduction apparatus according to claim 6, in which the phase offset is approximately equal to ($\psi=4\pi nd/\lambda$) (where "n" denotes a refractive index, "d" denotes a height difference between the land and the groove, and "λ" denotes a wavelength of light).

(8)

The reproduction apparatus according to (1), in which the reference light is generated by reflecting the light emitted from the light source on a mirror.

(9)

A reproduction method including:

irradiating a recording medium having both a land and a groove to which a signal is recorded with light emitted from a light source to obtain a signal light that contains recording signals of both the land and the groove and generate reference light from the light emitted from the light source, forming superposed light by superposing the signal light and the reference light, dividing a cross section of the superposed light into a plurality of regions in a tangential direction and/or in a radial direction using a light dividing element;

generating each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

outputting a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light by an optical receiver; and computing a differential signal a as a difference between the photodetection signal (I) and the photodetection signal (J) and a differential signal b as a difference between the photodetection signal (K) and the photodetection signal (L), and obtaining a reproduction signal by computation from the differential signals a and b by a reproduction signal generation circuit.

REFERENCE SIGNS LIST

1 Optical recording medium
28 Light dividing element
41, 60 Laser diode
15, 44 Objective lens
100, 200 Holographic optical element
104, $104_1$, $104_2$, $104_3$ Interpolation adaptive equalizer circuit

The invention claimed is:

1. A reproduction apparatus that irradiates a recording medium having both a land and a groove to which a signal is recorded with light emitted from a light source to obtain a signal light that contains recording signals of both the land and the groove and generate reference light from the light emitted from the light source, forms superposed light by superposing the signal light and the reference light, and divides a cross section of the superposed light into a plurality of regions in a tangential direction and/or in a radial direction using a light dividing element, the reproduction apparatus comprising:

an optical system configured to generate each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

an optical receiver configured to output a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light; and a reproduction signal generation circuit configured to compute a differential signal a as a difference between the photodetection signal (I) and the photodetection signal (J) and a differential signal b as a difference between the photodetection signal (K) and the photodetection signal (L), and obtain a reproduction signal by computation from the differential signals a and b, wherein a phase offset is applied to the differential signals a and b in advance.

2. The reproduction apparatus according to claim 1, wherein, assuming that "N" denotes a number of divisions of the light dividing element, the optical receiver outputs the photodetection signals (I) and (J), each of whose number is equal to or smaller than "N", and the photodetection signals (K) and (L), each of whose number is equal to or smaller than "N".

3. The reproduction apparatus according to claim 1, wherein, assuming that "N" denotes a number of divisions of the light dividing element, signals are output to one of a set of the photodetection signals (I) and (J) and a set of the photodetection signals (K) and (L), a number of signals being equal to or smaller than "N".

4. The reproduction apparatus according to claim 1, wherein the differential signals a and b are respectively supplied to adaptive equalizer circuits, and outputs of the adaptive equalizer circuits are combined to form a reproduction signal.

5. The reproduction apparatus according to claim 4, wherein the adaptive equalizer circuit obtains an equalization error from an equalization target signal and an equalization signal, and supplies the equalization error as a control signal for adaptive equalization.

6. The reproduction apparatus according to claim 1, wherein the phase offset is approximately equal to ($\psi=4\pi nd/\lambda$) (where "n" denotes a refractive index, "d" denotes a height difference between the land and the groove, and "$\lambda$" denotes a wavelength of light).

7. The reproduction apparatus according to claim 1, wherein the reference light is generated by reflecting the light emitted from the light source on a mirror.

8. A reproduction method comprising:

irradiating a recording medium having both a land and a groove to which a signal is recorded with light emitted from a light source to obtain a signal light that contains recording signals of both the land and the groove and generate reference light from the light emitted from the light source, forming superposed light by superposing the signal light and the reference light, dividing a cross section of the superposed light into a plurality of regions in a tangential direction and/or in a radial direction using a light dividing element;

generating each of a first set of the signal light and the reference light having a phase difference of approximately 0°, a second set of the signal light and the reference light having a phase difference of approximately 180°, a third set of the signal light and the reference light having a phase difference of approximately 90°, and a fourth set of the signal light and the reference light having a phase difference of approximately 270°, using a plurality of superposed light beams corresponding to the divided regions;

outputting a photodetection signal (I) corresponding to the first set of the signal light and the reference light, a photodetection signal (J) corresponding to the second set of the signal light and the reference light, a photodetection signal (K) corresponding to the third set of the signal light and the reference light, and a photodetection signal (L) corresponding to the fourth set of the signal light and the reference light by an optical receiver; and computing a differential signal a as a difference between the photodetection signal (I) and the photodetection signal (J) and a differential signal b as a difference between the photodetection signal (K) and the photodetection signal (L), and obtaining a reproduction signal by computation from the differential signals a and b by a reproduction signal generation circuit, wherein a phase offset is applied to the differential signals a and b in advance.

* * * * *